(12) United States Patent
Masuda et al.

(10) Patent No.: US 11,012,629 B2
(45) Date of Patent: May 18, 2021

(54) IMAGE CAPTURING APPARATUS, CONTROL METHOD FOR IMAGE CAPTURING APPARATUS, AND CONTROL PROGRAM FOR IMAGE CAPTURING APPARATUS

(71) Applicant: FUJIFILM Corporation, Tokyo (JP)

(72) Inventors: Tomonori Masuda, Saitama (JP); Mototada Otsuru, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 16/729,501

(22) Filed: Dec. 30, 2019

(65) Prior Publication Data

US 2020/0137284 A1    Apr. 30, 2020

Related U.S. Application Data

(63) Continuation of application No. PCT/JP2018/015336, filed on Apr. 12, 2018.

(30) Foreign Application Priority Data

Aug. 18, 2017 (JP) .............................. JP2017-158003

(51) Int. Cl.
*H04N 5/235* (2006.01)

(52) U.S. Cl.
CPC ......... *H04N 5/2352* (2013.01); *H04N 5/2351* (2013.01)

(58) Field of Classification Search
CPC ............. H04N 5/2254; H04N 5/23209; H04N 5/23218; H04N 5/23245; H04N 5/23254;

(Continued)

(56) References Cited

U.S. PATENT DOCUMENTS 6,456,730 B1 * 9/2002 Taniguchi ............ G06K 9/3241
382/103
8,432,458 B2    4/2013 Hirooka
(Continued)

FOREIGN PATENT DOCUMENTS

| CN | 104796621 | 7/2015 |
| CN | 106027918 | 10/2016 |

(Continued)

OTHER PUBLICATIONS

"Office Action of China Counterpart Application", dated Dec. 3, 2020, with English translation thereof, p. 1-p. 14.

(Continued)

*Primary Examiner* — Chiawei Chen
(74) *Attorney, Agent, or Firm* — JCIPRNET

(57) ABSTRACT

An image capturing apparatus includes: an image capturing unit that includes an imaging device in which pixels are arranged in a two-dimensional array and that outputs an image signal obtained by image capturing of a photographic subject by the imaging device; an image processing unit that generates a captured image based on the image signal; and a CPU that performs an exposure control process to determine whether an image of a moving subject is included in the captured image, that controls the amount of exposure of the imaging device by performing a first process in a case where the determination unit determines that an image of a moving subject is included in the captured image, and that controls the amount of exposure of the imaging device by performing a second process in a case where the determination unit determines that no moving-subject image is included in the captured image.

20 Claims, 17 Drawing Sheets

(58) Field of Classification Search
CPC ............ H04N 5/23293; H04N 5/2351; H04N 5/2352; H04N 5/2353; H04N 5/238; G03B 15/00; G03B 7/093
See application file for complete search history.

(56) References Cited

U.S. PATENT DOCUMENTS

| | | | |
|---|---|---|---|
| 9,319,594 B2 | 4/2016 | Iwasaki | |
| 9,544,506 B1* | 1/2017 | Wang | ................... H04N 5/2355 |
| 9,781,393 B2 | 10/2017 | Kudo et al. | |
| 9,801,530 B2* | 10/2017 | Kagaya | ............. H04N 5/23277 |
| 9,826,891 B2* | 11/2017 | Kagaya | ............... H04N 5/3532 |
| 10,277,841 B2 | 4/2019 | Zhou et al. | |
| 2003/0117672 A1* | 6/2003 | Geisbuesch | ............ H04N 5/361 |
| | | | 358/485 |
| 2006/0291844 A1* | 12/2006 | Kakkori | ................... G03B 9/28 |
| | | | 396/89 |
| 2008/0044170 A1* | 2/2008 | Yap | ........................ G03B 7/093 |
| | | | 396/52 |
| 2008/0144964 A1* | 6/2008 | Soinio | .................... G06T 5/006 |
| | | | 382/275 |
| 2008/0284871 A1* | 11/2008 | Kobayashi | ........... H04N 5/2353 |
| | | | 348/229.1 |
| 2012/0218426 A1* | 8/2012 | Kaizu | ................. H04N 5/35554 |
| | | | 348/208.4 |
| 2014/0232929 A1* | 8/2014 | Ichikawa | ................. G06T 7/246 |
| | | | 348/362 |
| 2015/0108329 A1* | 4/2015 | Ohki | .................. H04N 5/23254 |
| | | | 250/208.1 |
| 2015/0116525 A1* | 4/2015 | Peng | .................. H04N 5/23254 |
| | | | 348/218.1 |
| 2015/0296156 A1 | 10/2015 | Shin | |
| 2018/0027166 A1* | 1/2018 | Uchida | .................. G03B 13/36 |
| | | | 348/228.1 |
| 2018/0102386 A1* | 4/2018 | Kobayashi | ......... H04N 5/37452 |
| 2020/0014859 A1* | 1/2020 | Masuda | ............. H04N 5/37452 |

FOREIGN PATENT DOCUMENTS

| | | |
|---|---|---|
| CN | 106303269 | 1/2017 |
| JP | 2004056331 | 2/2004 |
| JP | 2010028596 | 2/2010 |
| JP | 2014039116 | 2/2014 |
| JP | 2015053652 | 3/2015 |
| JP | 2015136087 | 7/2015 |
| JP | 2016163322 | 9/2016 |

OTHER PUBLICATIONS

"International Search Report (Form PCT/ISA/210) of PCT/JP2018/015336," dated Jun. 19, 2018, with English translation thereof, pp. 1-5.

"Written Opinion of the International Searching Authority (Form PCT/ISA/237) of PCT/JP2018/015336," dated Jun. 19, 2018, with English translation thereof, pp. 1-9.

* cited by examiner

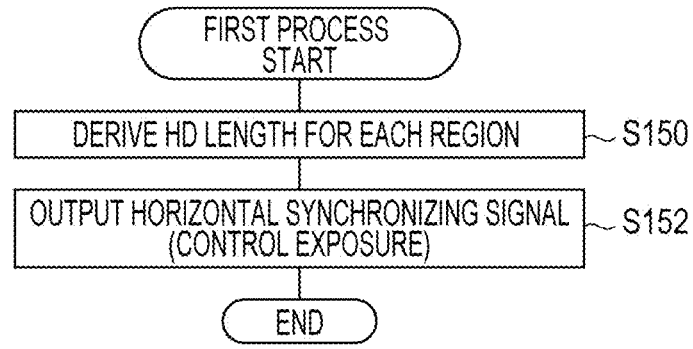
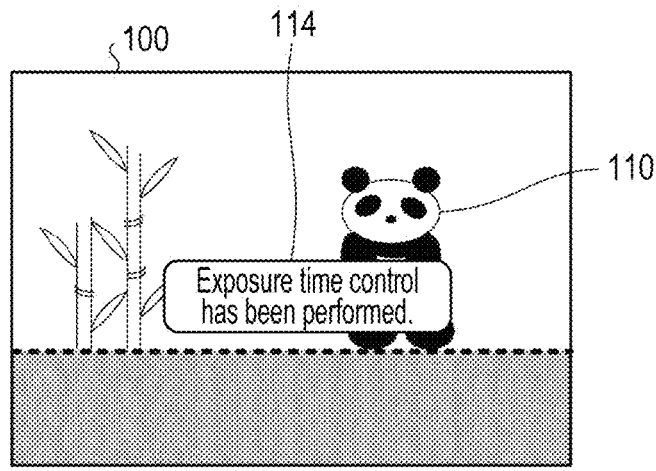
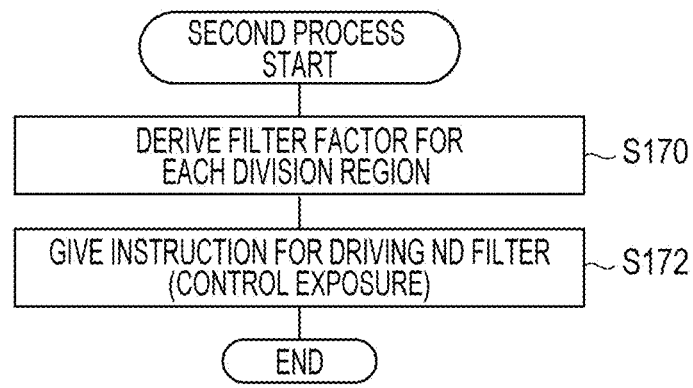

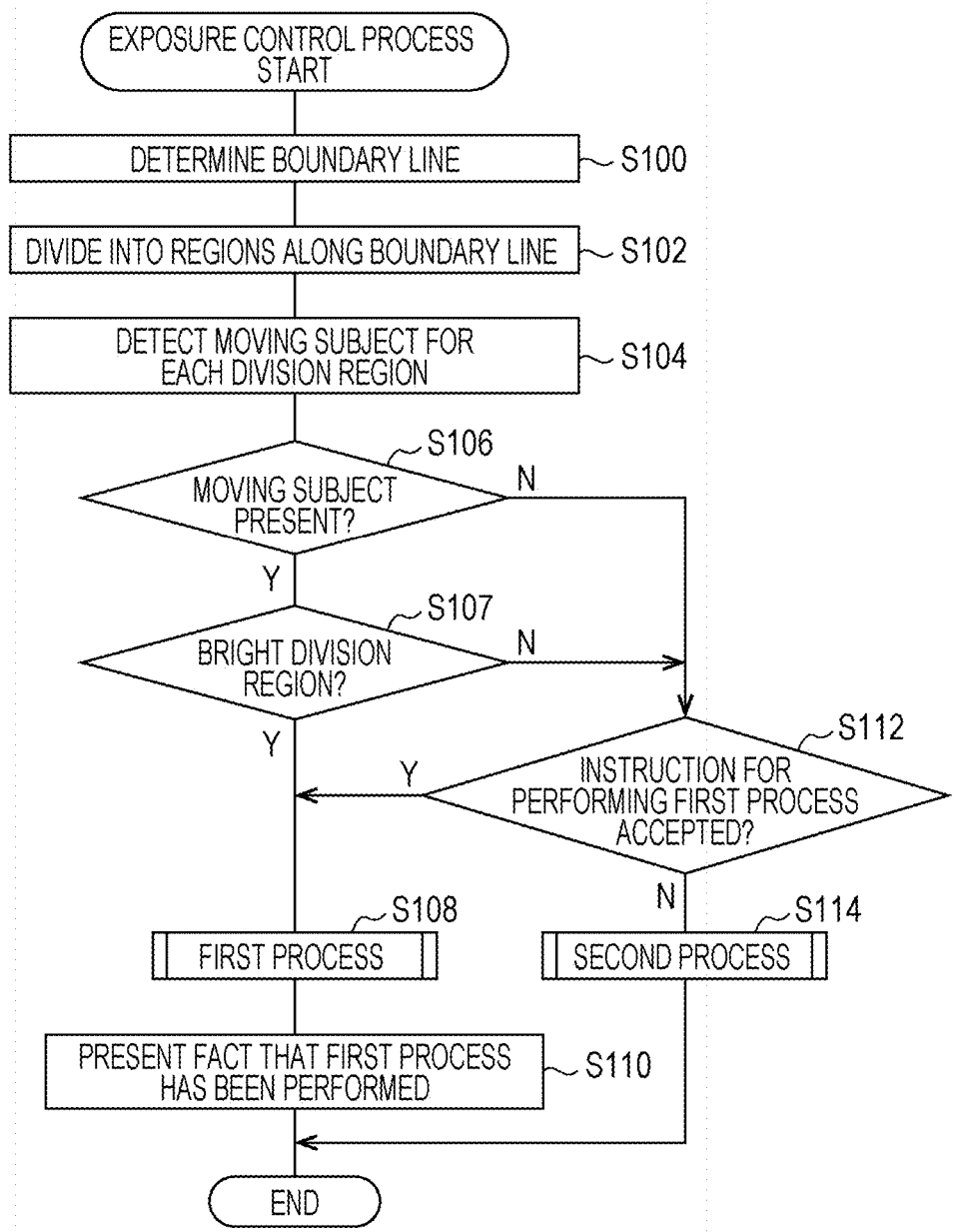

IMAGE CAPTURING APPARATUS, CONTROL METHOD FOR IMAGE CAPTURING APPARATUS, AND CONTROL PROGRAM FOR IMAGE CAPTURING APPARATUS

CROSS-REFERENCE TO RELATED APPLICATIONS

This application is a Continuation of PCT International Application No. PCT/JP2018/015336 filed on Apr. 12, 2018, which claims priority under 35 U.S.C § 119(a) to Japanese Patent Application No. 2017-158003 filed on Aug. 18, 2017. Each of the above application(s) is hereby expressly incorporated by reference, in its entirety, into the present application.

BACKGROUND OF THE INVENTION

1. Field of the Invention

A technique of the present disclosure relates to an image capturing apparatus, a control method for an image capturing apparatus, and a control program for an image capturing apparatus.

2. Description of the Related Art

For an image capturing apparatus in which image capturing of a photographic subject is performed by an imaging device through an image capturing optical system, as a technique for controlling the amount of exposure of the imaging device, a technique using a digital ND (neutral density) filter is disclosed in, for example, JP2015-136087A and JP2004-56331A. With the digital ND filter, an effect equivalent to that attained by providing a physical ND filter for the image capturing optical system can be attained.

SUMMARY OF THE INVENTION

In a case where an image capturing apparatus is used to capture an image of photographic subjects including a moving subject, the image quality of the moving subject may be compromised because, for example, the image of the moving subject is blurred in the captured image. Specifically, as the exposure time is longer, the image of the moving subject is more likely to be blurred. For example, in a case of controlling exposure by using the digital ND filter as described in JP2015-136087A and JP2004-56331A mentioned above, the exposure time is relatively long, and an image of a moving subject is likely to be blurred.

The present disclosure has been made in view of the above-described circumstances, and an object thereof is to provide an image capturing apparatus, a control method for an image capturing apparatus, and a control program for an image capturing apparatus with which the image quality of an image of a moving subject can be improved.

To achieve the above-described object, an image capturing apparatus according to a first aspect of the present disclosure includes: an image capturing unit that includes an imaging device in which a plurality of pixels are arranged in a two-dimensional array and that outputs an image signal obtained by image capturing of a photographic subject by the imaging device through an image capturing optical system; an image generation unit that generates a captured image based on the image signal; a determination unit that determines whether an image of a moving subject is included in the captured image; an amount-of-exposure control unit that controls an amount of exposure of the imaging device by performing a first process for controlling an exposure time of the imaging device for each row of the array of the plurality of pixels in a case where the determination unit determines that an image of a moving subject is included in the captured image, and that controls the amount of exposure of the imaging device by performing a second process different from the first process in a case where the determination unit determines that no moving-subject image is included in the captured image; and a display unit that displays the captured image obtained with the amount of exposure controlled by the amount-of-exposure control unit.

An image capturing apparatus according to a second aspect is the image capturing apparatus according to the first aspect in which the amount-of-exposure control unit may control an amount of light that reaches the imaging device per unit time as the second process.

An image capturing apparatus according to a third aspect is the image capturing apparatus according to the first or second aspect in which the amount-of-exposure control unit may perform the first process in a case where a brightness of a moving-subject region that includes the image of the moving subject is equal to or higher than a predetermined brightness.

An image capturing apparatus according to a fourth aspect is the image capturing apparatus according to the first or second aspect in which the amount-of-exposure control unit may perform the second process in a case where a brightness of a moving-subject region that includes the image of the moving subject is lower than a predetermined brightness.

An image capturing apparatus according to a fifth aspect is the image capturing apparatus according to the third or fourth aspect in which the amount-of-exposure control unit may divide the captured image into a plurality of division regions on the basis of a result of analysis of the captured image, and the amount-of-exposure control unit may assume a region in which the image of the moving subject is included among the plurality of division region to be the moving-subject region.

An image capturing apparatus according to a sixth aspect is the image capturing apparatus according to any one of the first to fifth aspects in which the amount-of-exposure control unit may divide the captured image into a plurality of division regions along a boundary line determined on the basis of a result of analysis of the captured image.

An image capturing apparatus according to a seventh aspect is the image capturing apparatus according to any one of the first to sixth aspects in which the amount-of-exposure control unit may perform the first process in a case where a moving speed of the moving subject detected from the image of the moving subject is equal to or higher than a predetermined speed.

An image capturing apparatus according to an eighth aspect is the image capturing apparatus according to any one of the first to sixth aspects in which the amount-of-exposure control unit may perform the second process in a case where a moving speed of the moving subject detected from the image of the moving subject is lower than a predetermined speed.

An image capturing apparatus according to a ninth aspect is the image capturing apparatus according to any one of the first to sixth aspects in which the amount-of-exposure control unit may perform the first process in a case where an amount of movement, per unit time, of the moving subject detected from the image of the moving subject is equal to or larger than a predetermined amount of movement.

An image capturing apparatus according to a tenth aspect is the image capturing apparatus according to any one of the first to sixth aspects in which the amount-of-exposure control unit may perform the second process in a case where an amount of movement, per unit time, of the moving subject detected from the image of the moving subject is smaller than a predetermined amount of movement.

An image capturing apparatus according to an eleventh aspect is the image capturing apparatus according to any one of the first to tenth aspects in which before performing the first process, the amount-of-exposure control unit may communicate information indicating that the amount-of-exposure control unit is going to perform the first process.

An image capturing apparatus according to a twelfth aspect is the image capturing apparatus according to any one of the first to tenth aspects in which the amount-of-exposure control unit may communicate predetermined information in a case where the determination unit determines that an image of a moving subject is included in the captured image.

An image capturing apparatus according to a thirteenth aspect is the image capturing apparatus according to any one of the first to twelfth aspects in which after performing the first process, the amount-of-exposure control unit may communicate information indicating that the amount-of-exposure control unit has performed the first process.

An image capturing apparatus according to a fourteenth aspect is the image capturing apparatus according to any one of the first to tenth aspects and may further include an accepting unit that accepts an instruction for performing the first process, in which the amount-of-exposure control unit may perform the first process in a case where the determination unit determines that an image of a moving subject is included in the captured image and the accepting unit accepts an instruction for performing the first process.

An image capturing apparatus according to a fifteenth aspect is the image capturing apparatus according to the fourteenth aspect in which the amount-of-exposure control unit may perform the second process in a case where the determination unit determines that an image of a moving subject is included in the captured image but the accepting unit does not accept an instruction for performing the first process.

An image capturing apparatus according to a sixteenth aspect is the image capturing apparatus according to any one of the first to fifteenth aspects in which in a case of performing the first process, the amount-of-exposure control unit may divide the captured image into a plurality of division regions along a boundary line determined on the basis of a result of analysis of the captured image, and may perform the first process for each of the plurality of division regions obtained as a result of division.

An image capturing apparatus according to a seventeenth aspect is the image capturing apparatus according to the first or second aspect in which in a case where the determination unit determines that an image of a moving subject is included in the captured image, the amount-of-exposure control unit may divide the captured image into a plurality of division regions on the basis of a result of analysis of the captured image, may perform the first process for a division region that includes the image of the moving subject among the plurality of division regions obtained as a result of division, and may perform the second process or might not control the amount of exposure of the imaging device for a division region other than the division region that includes the image of the moving subject.

A control method for an image capturing apparatus according to an eighteenth aspect includes a process including: generating a captured image based on an image signal obtained by image capturing of a photographic subject by an imaging device in which a plurality of pixels are arranged in a two-dimensional array; determining whether an image of a moving subject is included in the captured image; controlling an amount of exposure of the imaging device by performing a first process for controlling an exposure time of the imaging device for each row of the array of the plurality of pixels in a case where an image of a moving subject is determined to be included in the captured image; controlling the amount of exposure of the imaging device by performing a second process different from the first process in a case where no moving-subject image is determined to be included in the captured image; and displaying the captured image obtained with the controlled amount of exposure.

A control program for an image capturing apparatus according to a nineteenth aspect causes a computer to perform a process including: generating a captured image based on an image signal obtained by image capturing of a photographic subject by an imaging device in which a plurality of pixels are arranged in a two-dimensional array; determining whether an image of a moving subject is included in the captured image; controlling an amount of exposure of the imaging device by performing a first process for controlling an exposure time of the imaging device for each row of the array of the plurality of pixels in a case where an image of a moving subject is determined to be included in the captured image; controlling the amount of exposure of the imaging device by performing a second process different from the first process in a case where no moving-subject image is determined to be included in the captured image; and displaying the captured image obtained with the controlled amount of exposure.

According to the present disclosure, the image quality of an image of a moving subject can be improved.

BRIEF DESCRIPTION OF THE DRAWINGS

FIG. 10 is a flowchart illustrating an example flow of the first process;

FIG. 11 is a diagram for explaining presentation of the fact that the first process has been performed;

FIG. 12 is a flowchart illustrating an example flow of a second process;

FIG. 13 is a flowchart illustrating an example flow of an exposure control process according to the second embodiment;

DESCRIPTION OF THE PREFERRED EMBODIMENTS

Hereinafter, example embodiments of the technique of the present disclosure will be described in detail with reference to the drawings.

First Embodiment

Figure 1:
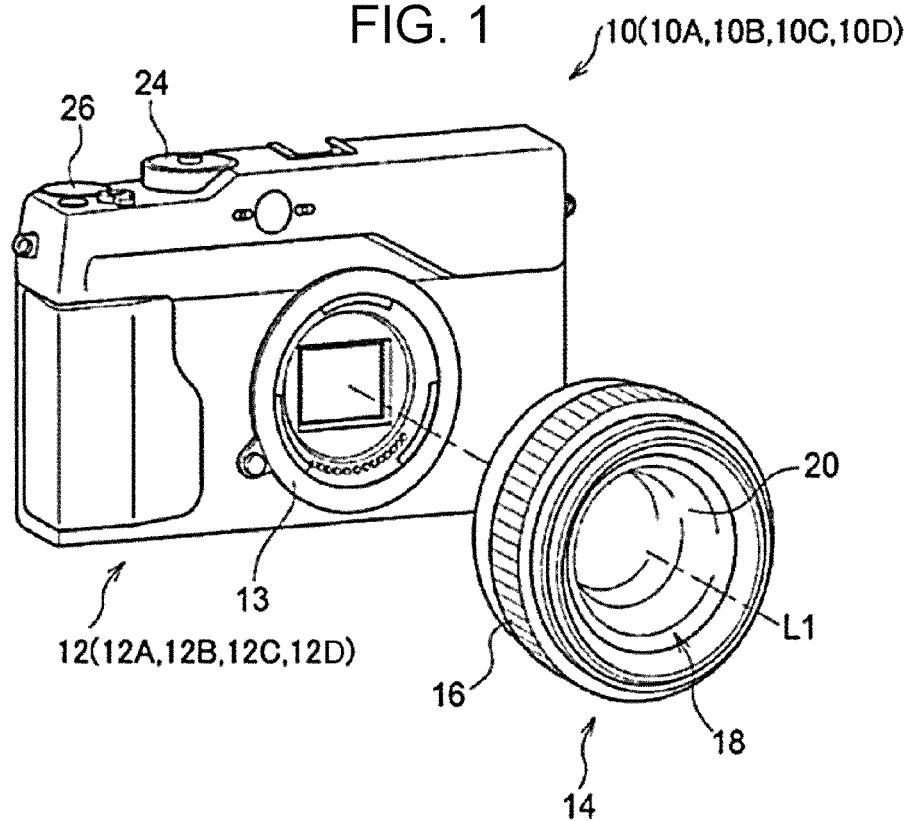
FIG. 1 is a perspective view illustrating an example external appearance of an image capturing apparatus according to first to fifth embodiments.

First, an example configuration of an image capturing apparatus 10 of this embodiment will be described with reference to FIG. 1 to FIG. 3. As illustrated in FIG. 1, for example, the image capturing apparatus 10 of this embodiment is an interchangeable-lens digital camera and includes an image capturing apparatus main body 12 and an image capturing lens 14.

The image capturing lens 14 is attached to the image capturing apparatus main body 12 so as to be interchangeable. On the lens barrel of the image capturing lens 14, a focus ring 16 that is used in a manual focus mode is provided. The image capturing lens 14 includes a lens unit 18. The lens unit 18 of this embodiment is an example of an image capturing optical system of the present disclosure.

The lens unit 18 is a combination lens in which a plurality of lenses including a focus lens 20 are combined. The focus lens 20 moves in the direction of an optical axis L1 in accordance with a manual rotation operation of the focus ring 16, and photographic subject light, which is reflected light representing a photographic subject, forms an image on a photosensitive surface 22A of an imaging device 22 (see FIG. 3) described below at an in-focus position corresponding to the distance to the photographic subject.

On the top surface of the image capturing apparatus main body 12, a dial 24 and a release button 26 are provided. The dial 24 is operated for various settings, such as switching between an image capture mode and a playback mode.

Accordingly, in the image capturing apparatus 10, in a case where the dial 24 is operated by the user, the image capture mode or the playback mode is selectively set as an operation mode.

As the operation mode for image capturing, the image capturing apparatus 10 has a still-image capture mode and a moving-image capture mode. The still-image capture mode is an operation mode for recording a still image obtained by image capturing of a photographic subject by the image capturing apparatus 10. The moving-image capture mode is an operation mode for recording a moving image obtained by image capturing of a photographic subject by the image capturing apparatus 10.

The release button 26 is configured to be capable of detecting a depressing operation in two stages, that is, an image capture preparation instruction state and an image capture instruction state. The image capture preparation instruction state refers to a state where, for example, the release button 26 is depressed from a standby position to an intermediate position (half-push position), and the image capture instruction state refers to a state where the release button 26 is depressed to a final depress position (full-push position) beyond the intermediate position. Hereinafter, the "state where the release button 26 is depressed from the standby position to the half-push position" is called "half-push state", and the "state where the release button 26 is depressed from the standby position to the full-push position" and the "state where the release button 26 is depressed from the half-push position to the full-push position" are called "full-push state".

In an autofocus mode, in a case where the release button 26 is set to the half-push state, image capture conditions are adjusted, and thereafter, in a case where the release button 26 is subsequently set to the full-push state, actual exposure is performed. That is, in a case where the release button 26 is set to the half-push state, an AE (auto-exposure) function is activated and the exposure state is set, and thereafter, an AF (autofocus) function is activated and in-focus control is performed. In a case where the release button 26 is set to the full-push state, image capturing is performed.

Figure 2:
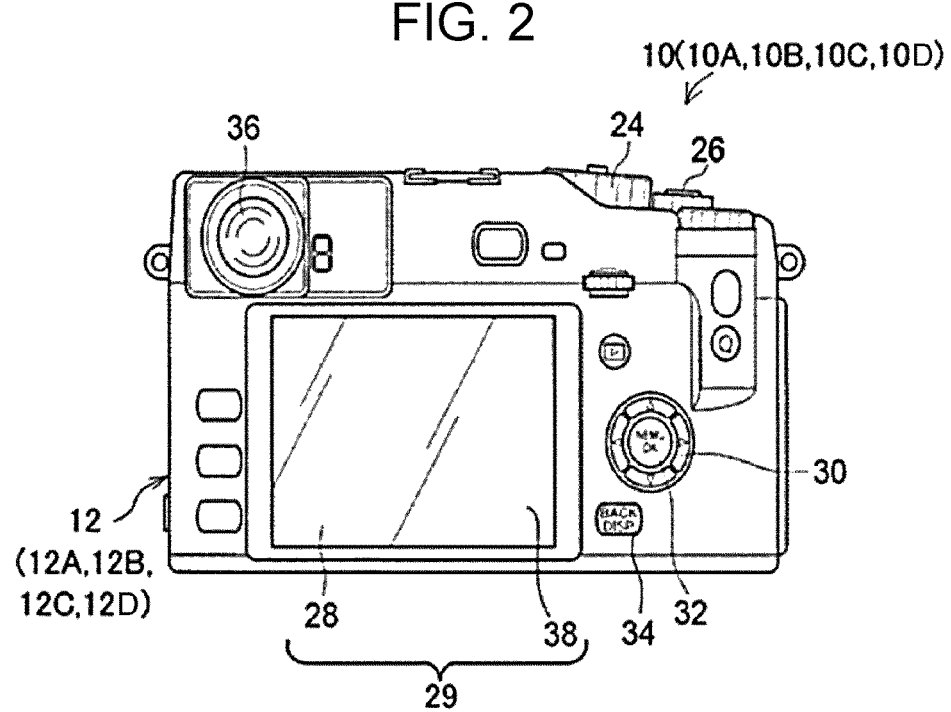
FIG. 2 is a rear view illustrating an example external appearance of the rear surface side of the image capturing apparatus according to the first to fifth embodiments.

As illustrated in FIG. 2, for example, on the rear surface of the image capturing apparatus main body 12, a display 28, a cross key 30, a MENU/OK key 32, a BACK/DISP button 34, a viewfinder 36, and a touch panel 38 are provided.

The display 28 is, for example, an LCD (liquid crystal display) and displays an image obtained by image capturing of a photographic subject by the image capturing apparatus 10, text, and so on. The display 28 of this embodiment is an example of a display unit of the present disclosure. The display 28 of this embodiment and the touch panel 38 constitute a touch panel display 29. The display 28 is used to display a live preview image in the image capture mode. The live preview image is also called a through-image and is a series of frame images obtained by the imaging device 22 of the image capturing apparatus 10 performing image capturing of a photographic subject as a series of frames. In a case where an instruction for still-image capturing is given, the display 28 is used to also display a still image obtained by single-frame image capturing. Further, the display 28 is used to also display a playback image in the playback mode, a menu screen, and so on.

On the surface of a display region of the display 28, the touch panel 38 of a transparent type is overlaid. The touch panel 38 senses, for example, a touch of an instructing object, such as a finger or a stylus pen. The touch panel 38 outputs, to a predetermined output destination (for example, a CPU (central processing unit) 74 described below, see FIG.

3), sensing result information indicating the sensing result, such as the presence or absence of a touch of an instructing object on the touch panel 38, at predetermined intervals of, for example, 100 milliseconds. In a case where the touch panel 38 senses a touch of an instructing object, the sensing result information includes two-dimensional coordinates (hereinafter referred to as "coordinates") with which the position at which the instructing object touches the touch panel 38 can be identified. In a case where the touch panel 38 does not sense a touch of an instructing object, the sensing result information does not include the coordinates.

The cross key 30 functions as a multifunction key for selecting one or more menus and for outputting instruction detail signals corresponding to various instructions including zooming, frame-by-frame playback, and so on. The MENU/OK key 32 is an operation key having both the function of a menu (MENU) button for giving an instruction for displaying one or more menus on the screen of the display 28 and the function of an accepting (OK) button for, for example, confirming a selection and giving an instruction for execution. The BACK/DISP button 34 is used in a case of, for example, erasing a desired target, such as a selected item, cancelling a specification, or returning to the previous operation state.

Figure 3:
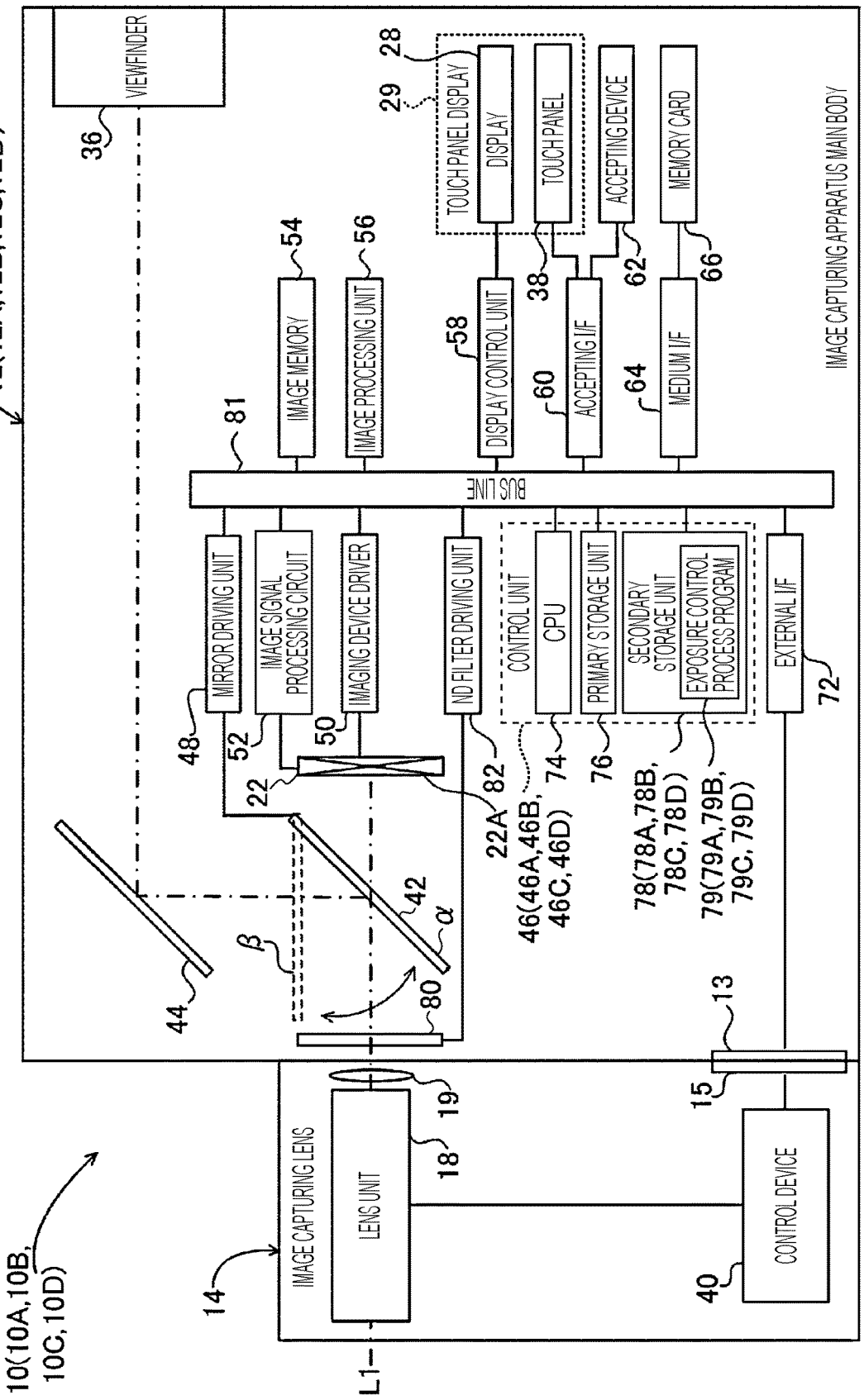
FIG. 3 is a block diagram illustrating an example hardware configuration of the image capturing apparatus according to the first to fifth embodiments.

FIG. 3 is a block diagram illustrating an example hardware configuration of the image capturing apparatus 10 according to the first embodiment.

As illustrated in FIG. 3, the image capturing apparatus main body 12 of this embodiment includes a mount 13 (see also FIG. 1), and the image capturing lens 14 includes a mount 15. In a case where the mount 15 is coupled with the mount 13, the image capturing lens 14 is attached to the image capturing apparatus main body 12 so as to be interchangeable.

The image capturing lens 14 includes the lens unit 18 described above, an aperture diaphragm 19, and a control device 40. In a case where the mount 15 is connected with the mount 13, the control device 40 is electrically connected to the CPU 74 through an external I/F (interface) 72 of the image capturing apparatus main body 12 to control the image capturing lens 14 as a whole in accordance with instructions from the CPU 74.

The aperture diaphragm 19 is provided on the image capturing apparatus main body 12 side relative to the lens unit 18. To the aperture diaphragm 19, a diaphragm driving unit and a diaphragm driving motor not illustrated are connected. The diaphragm driving unit is controlled by the control device 40 to operate the diaphragm driving motor in accordance with an instruction accepted by an accepting device 62 described below to adjust the size of the aperture of the aperture diaphragm 19, thereby adjusting the amount of photographic subject light that has passed through the lens unit 18 and guiding the photographic subject light into the image capturing apparatus main body 12.

As illustrated in FIG. 3, the image capturing apparatus main body 12 of this embodiment includes the imaging device 22, a first mirror 42, a second mirror 44, a control unit 46, a mirror driving unit 48, an imaging device driver 50, an image signal processing circuit 52, an image memory 54, an image processing unit 56, a display control unit 58, an ND (neutral density) filter 80, and an ND filter driving unit 82. The image capturing apparatus main body 12 further includes an accepting I/F 60, the accepting device 62, a medium I/F 64, and the external I/F 72.

The control unit 46 is an example of a computer in the technique of the present disclosure and includes the CPU 74, a primary storage unit 76, and a secondary storage unit 78.

The CPU 74 controls the image capturing apparatus 10 as a whole. The primary storage unit 76 is a volatile memory that is used as a work area and so on in a case where various programs are executed. Examples of the primary storage unit 76 include a RAM (random access memory). The secondary storage unit 78 of this embodiment is a nonvolatile memory that stores in advance various programs including an exposure control process program 79 described in detail below, various parameters, and so on. Examples of the secondary storage unit 78 include an EEPROM (electrically erasable programmable read-only memory) and a flash memory.

The CPU 74, the primary storage unit 76, and the secondary storage unit 78 are connected to a bus line 81. The mirror driving unit 48, the imaging device driver 50, the image signal processing circuit 52, and the ND filter driving unit 82 are also connected to the bus line 81. The image memory 54, the image processing unit 56, the display control unit 58, the accepting I/F 60, the medium I/F 64, and the external I/F 72 are also connected to the bus line 81.

The first mirror 42 is interposed between the photosensitive surface 22A of the imaging device 22 and the lens unit 18 and is a movable mirror that can be moved to a photosensitive surface cover position a and to a photosensitive surface open position β.

The first mirror 42 is connected to the mirror driving unit 48, and the mirror driving unit 48 is controlled by the CPU 74 to drive the first mirror 42 and place the first mirror 42 in the photosensitive surface cover position α or the photosensitive surface open position β in a selective manner. That is, in a case of not allowing the photosensitive surface 22A to receive photographic subject light, the first mirror 42 is placed in the photosensitive surface cover position a by the mirror driving unit 48, and in a case of allowing the photosensitive surface 22A to receive photographic subject light, the first mirror 42 is placed in the photosensitive surface open position β by the mirror driving unit 48.

In the photosensitive surface cover position a, the first mirror 42 covers the photosensitive surface 22A, and reflects and guides photographic subject light incoming from the lens unit 18 to the second mirror 44. The second mirror 44 reflects the photographic subject light guided by the first mirror 42 to thereby guide the photographic subject light to the viewfinder 36 through an optical system (not illustrated). The viewfinder 36 transmits the photographic subject light guided by the second mirror 44.

In the photosensitive surface open position 13, the photosensitive surface 22A covered by the first mirror 42 is uncovered, and photographic subject light is received by the photosensitive surface 22A without reflected by the first mirror 42.

The ND filter 80 of this embodiment is an ND filter having a plurality of graduated light transmittances. For example, the ND filter 80 may have a plurality of continuous light transmittances. The ND filter 80 of this embodiment is placed between the first mirror 42 in the photosensitive surface cover position a and the aperture diaphragm 19 (lens unit 18) on the optical axis L1. The ND filter 80 is connected to the ND filter driving unit 82. The CPU 74 changes a voltage to be applied to the ND filter 80 from the ND filter driving unit 82 to thereby control the light transmittance of the ND filter 80 in accordance with a predetermined resolution. The CPU 74 thus controls the light transmittance of the ND filter 80 to thereby control the amount of exposure of the imaging device 22, more specifically, the amount of light that reaches the imaging device 22 per unit time. In a case where the first mirror 42 is placed in the photosensitive surface cover position a, the ND filter driving unit 82 controls the light transmittance of the ND filter 80 to thereby control the amount of photographic subject light that reaches the viewfinder 36. The process in which the CPU 74 controls the light transmittance of the ND filter 80 to thereby control the amount of exposure of the imaging device 22 is called "second process".

Specific examples of the ND filter 80 of this embodiment include an electrochromic element in which molecules undergo an oxidation-reduction reaction or enter a radical state in response to an applied voltage and the light transmittance reversibly changes and a liquid crystal shutter in which the orientations of molecules change in response to an applied voltage and the light transmittance reversibly changes; however, the specific examples are not limited to these. Specific examples of the liquid crystal shutter include a twisted nematic (TN) liquid crystal shutter and a guest-host (GH) liquid crystal shutter.

The imaging device driver 50 is connected to the imaging device 22. In this embodiment, a CCD (charge-coupled device) image sensor is used as the imaging device 22; however, the technique of the present disclosure is not limited to this. For example, another image sensor, such as a CMOS (complementary metal-oxide semiconductor) image sensor, may be used.

Figure 4:
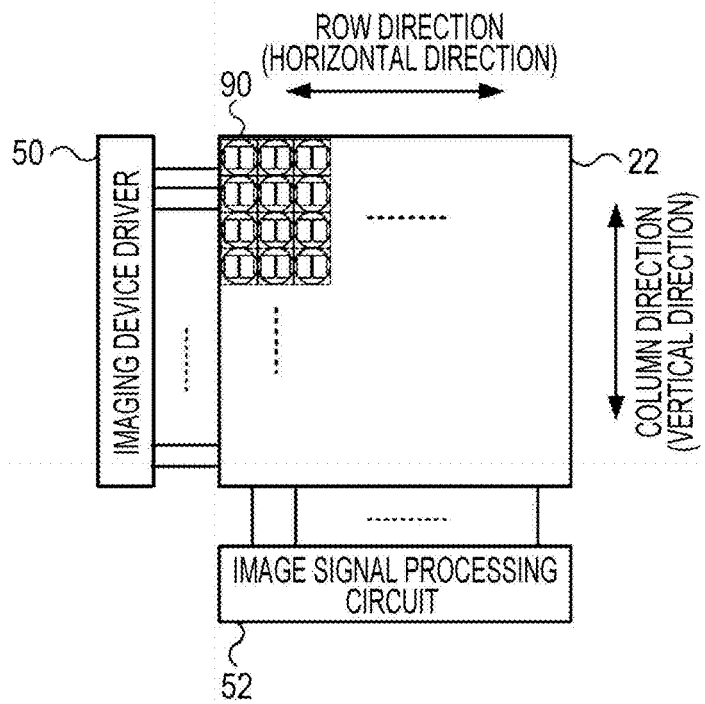
FIG. 4 is a diagram illustrating an example configuration of an imaging device according to the first to fifth embodiments.

In the imaging device 22 of this embodiment, for example, a plurality of pixels 90 are arranged in a two-dimensional array, as illustrated in FIG. 4. The number of pixels 90 and the number of rows and the number of columns of the array are not specifically limited. Each pixel 90 is driven in accordance with a vertical synchronizing signal output to the imaging device driver 50 from the CPU 74 and a horizontal synchronizing signal output to the image signal processing circuit 52, and exposure of the imaging device 22 is controlled.

Figure 5:
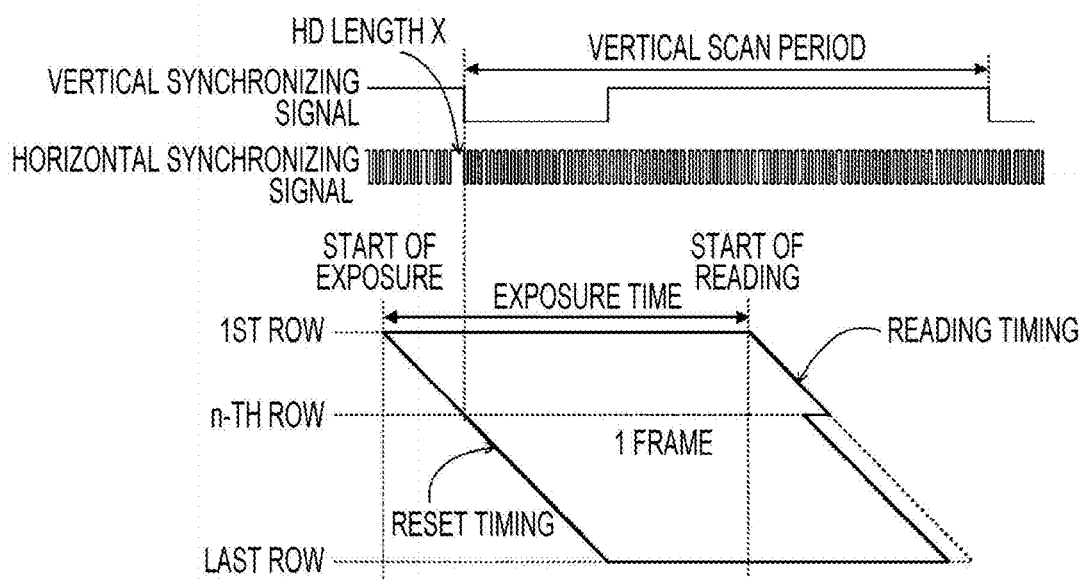
FIG. 5 is a diagram for explaining the principle of a first process.

In general, the exposure time of the imaging device 22 is controlled in accordance with the interval (hereinafter referred to as "HD length") of the scan period of the horizontal synchronizing signal. Therefore, in a case where the horizontal synchronizing signal includes an HD length X as illustrated in FIG. 5, the time during which electric charge is accumulated in the pixels 90 changes between the rows of the pixels 90 corresponding to pulses before and after the HD length X, that is, between the n-th row and the (n+1)-th row in the case illustrated in FIG. 5, the exposure time changes accordingly, and the exposure time becomes shorter in the (n+1)-th and the subsequent rows than in the rows up to the n-th row.

The CPU 74 of this embodiment changes the HD length of the horizontal synchronizing signal to be output to the image signal processing circuit 52 to thereby control the amount of exposure of the imaging device 22 for each row of the array of the pixels 90. The process in which the CPU 74 changes the HD length to thereby control the amount of exposure of the imaging device 22 is called "first process".

The image signal processing circuit 52 reads an image signal for one frame from each pixel of the imaging device 22 in accordance with the horizontal synchronizing signal described above. The image signal processing circuit 52 performs various types of processing including correlative double sampling processing, automatic gain control, and A/D (analog/digital) conversion for the read image signals. The image signal processing circuit 52 outputs digitized image signals obtained as a result of various type of processing performed for the image signals to the image memory 54 on a per frame basis at a specific frame rate (for example, several tens of frames/sec.) defined by a clock signal supplied from the CPU 74.

The imaging device 22 and the imaging device driver 50 of this embodiment correspond to an example of an image capturing unit of the present disclosure.

The image memory 54 temporarily retains image signals input from the image signal processing circuit 52.

The image processing unit 56 obtains image signals from the image memory 54 at a specific frame rate on a per frame basis and performs various types of processing including gamma correction, brightness conversion, color difference conversion, and compression on the obtained image signals. The image processing unit 56 outputs image signals obtained as a result of various types of processing to the display control unit 58 at a specific frame rate on a per frame basis. Further, the image processing unit 56 outputs the image signals obtained as a result of various types of processing to the CPU 74 in response to a request from the CPU 74. The image processing unit 56 of this embodiment is an example of an image generation unit of the present disclosure.

The display control unit 58 is connected to the display 28 of the touch panel display 29 and is controlled by the CPU 74 to control the display 28. The display control unit 58 outputs image signals input from the image processing unit 56 to the display 28 at a specific frame rate on a per frame basis.

The display 28 displays an image represented by image signals input from the display control unit 58 at a specific frame rate as a live preview image. The display 28 also displays a still image, which is a single-frame image obtained by single-frame image capturing. On the display 28, a playback image, a menu screen, and so on are displayed in addition to a live preview image.

The accepting device 62 has the dial 24, the release button 26, the cross key 30, the MENU/OK key 32, the BACK/DISP button 34, and so on and accepts various instructions from the user.

The touch panel 38 of the touch panel display 29 and the accepting device 62 are connected to the accepting I/F 60 and output an instruction detail signal indicating the details of an accepted instruction to the accepting I/F 60. The accepting I/F 60 outputs the input instruction detail signal to the CPU 74. The CPU 74 performs a process corresponding to the instruction detail signal input from the accepting I/F 60. The touch panel 38 and the accepting device 62 of this embodiment correspond to an example of an accepting unit of the present disclosure.

To the medium I/F 64, a memory card 66 is connected so as to be detachable and re-attachable. The medium I/F 64 is controlled by the CPU 74 to record and read an image file to and from the memory card 66. The medium I/F 64 and the memory card 66 of this embodiment correspond to an example of a recording unit of the present disclosure.

An image file read from the memory card 66 by the medium I/F 64 is subjected to decompression by the image processing unit 56 controlled by the CPU 74 and is displayed on the display 28 as a playback image.

In the image capturing apparatus 10, the operation mode is switched in accordance with an instruction accepted by the accepting device 62. In the image capturing apparatus 10, for example, in the image capture mode, the still-image capture mode and the moving-image capture mode are selectively set in accordance with an instruction accepted by the accepting device 62. In the still-image capture mode, a still-image file can be recorded to the memory card 66. In the moving-image capture mode, a moving-image file can be recorded to the memory card 66.

In a case where an instruction for capturing a still image given by using the release button 26 is accepted in the still-image capture mode, the CPU 74 controls the imaging device driver 50 to allow the imaging device 22 to be actually exposed for one frame. The image processing unit 56 is controlled by the CPU 74 to obtain image signals obtained as a result of the exposure for one frame, perform compression on the obtained image signals, and generate a still-image file in a specific still-image format. The specific still-image format may be, for example, the JPEG (Joint Photographic Experts Group) format. The still-image file is recorded to the memory card 66 through the medium I/F 64 by the image processing unit 56 controlled by the CPU 74.

In a case where an instruction for capturing a moving image given by using the release button 26 is accepted in the moving-image capture mode, the image processing unit 56 performs compression on image signals for a live preview image and generates a moving-image file in a specific moving-image format. The specific moving-image format may be, for example, the MPEG (Moving Picture Experts Group) format. The moving-image file is recorded to the memory card 66 through the medium I/F 64 by the image processing unit 56 controlled by the CPU 74.

Next, as the operations of the image capturing apparatus 10 of this embodiment, operations of the image capturing apparatus 10 to be performed in a case of performing an exposure control process of this embodiment will be described.

In the image capturing apparatus 10 of this embodiment, in the image capture mode, a live preview image is displayed on the touch panel display 29 as described above. In the image capturing apparatus 10 of this embodiment, the exposure control process for controlling the exposure of the live preview image displayed on the touch panel display 29 is performed.

Figure 6:
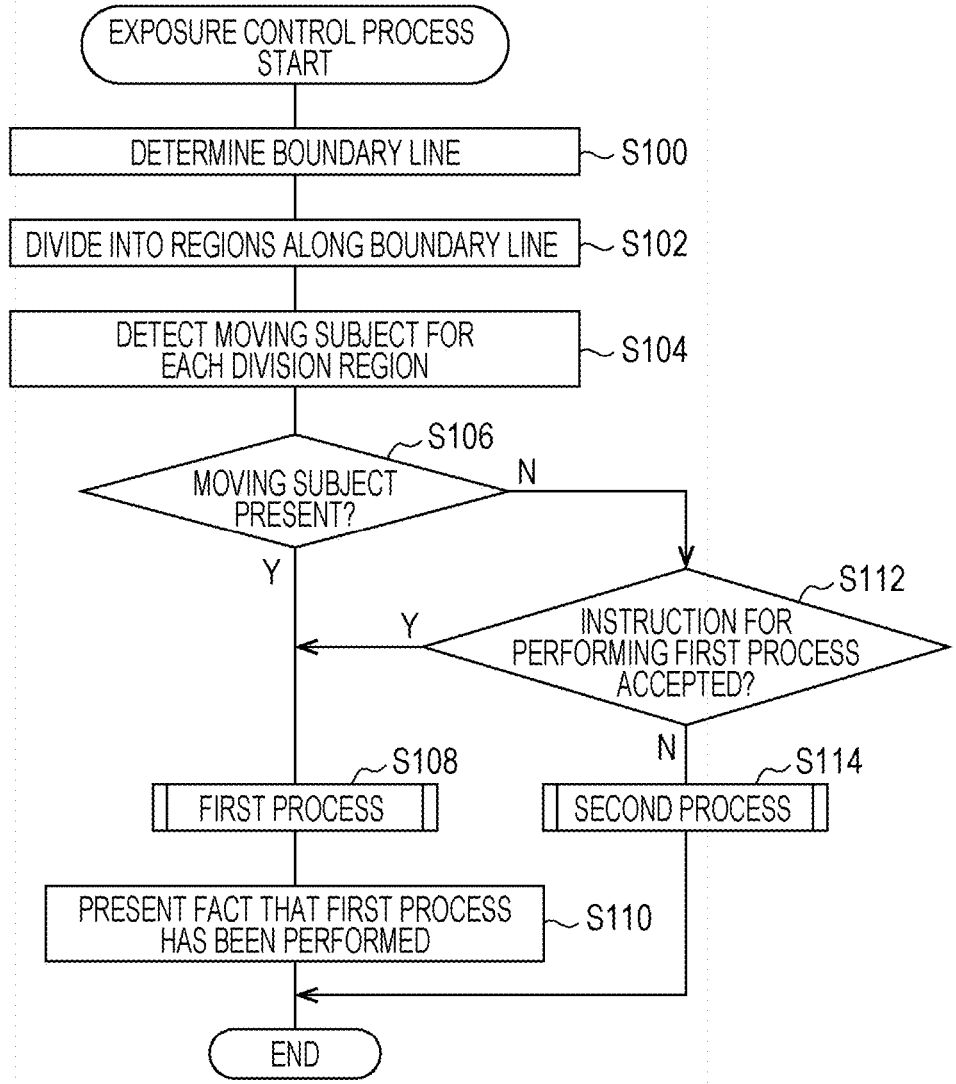
FIG. 6 is a flowchart illustrating an example flow of an exposure control process according to the first embodiment.

Specifically, in a case where a transition to the image capture mode occurs, the CPU 74 of the image capturing apparatus 10 of this embodiment reads from the secondary storage unit 78, loads to the primary storage unit 76, and executes the exposure control process program 79 to thereby perform the exposure control process, an example of which is illustrated in FIG. 6. The CPU 74 executes the exposure control process program 79 to thereby function as a determination unit and an amount-of-exposure control unit of the present disclosure.

Figure 7:
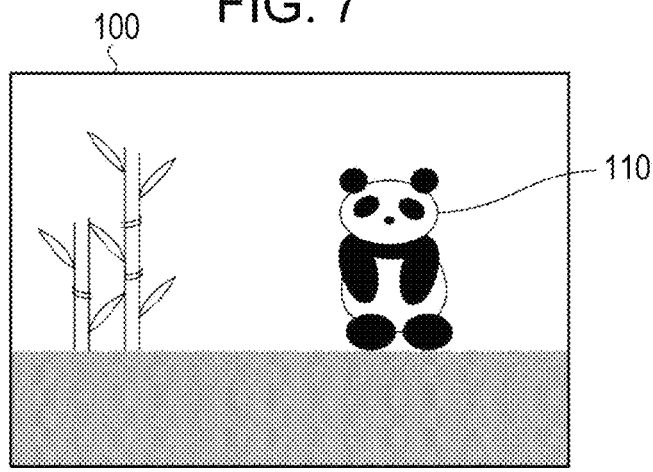
FIG. 7 is a diagram illustrating an example live preview image.

For convenience of description, a description is given below of a case where the exposure control process is performed for a live preview image 100, an example of which is illustrated in FIG. 7, displayed on the touch panel display 29. The live preview image 100 illustrated in FIG. 7 is an example of the live preview image 100 obtained by capturing an image of photographic subjects that include a moving subject 110.

In the image capturing apparatus 10 of this embodiment, exposure is controlled for each of the plurality of regions set by dividing the live preview image 100 along a boundary line. In other words, the CPU 74 of this embodiment controls exposure for each of the regions obtained by dividing the live preview image 100 along a boundary line.

Figure 8:
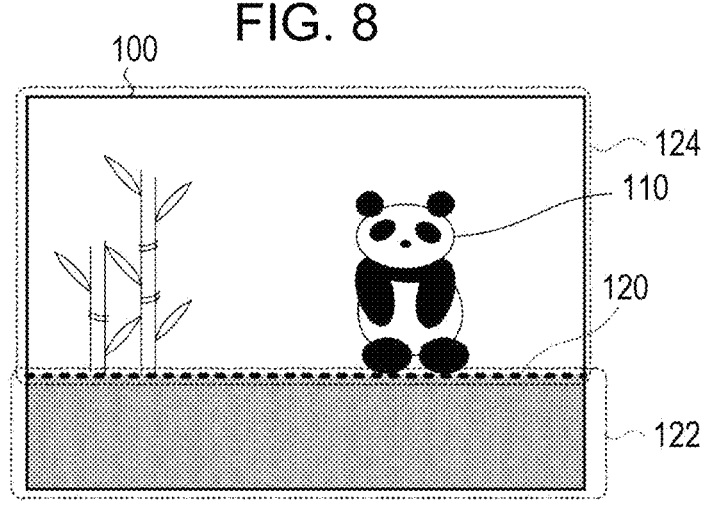
FIG. 8 is a diagram for explaining an example boundary line and example division regions derived from the live preview image illustrated in FIG. 7.

For this, first, in step S100 in FIG. 6, the CPU 74 performs an image analysis of the live preview image 100 and determines the position of a boundary line for setting regions for which exposure is controlled. FIG. 8 illustrates an example of a boundary line 120 determined for the live preview image 100.

Figure 9:
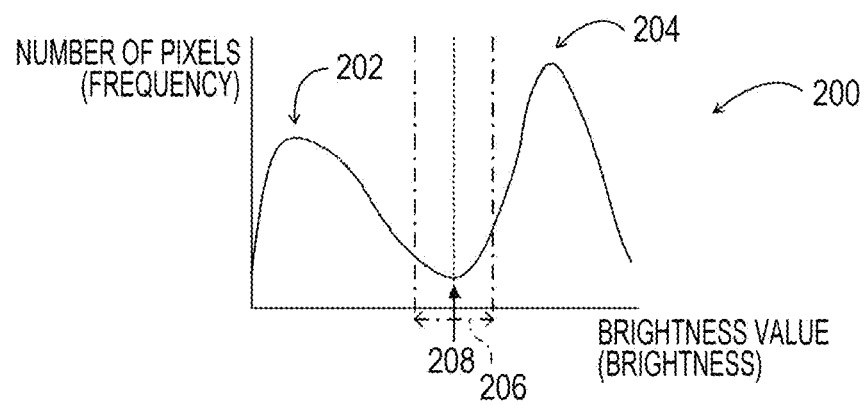
FIG. 9 is a diagram illustrating an example histogram of the live preview image.

The method for determining the position of the boundary line by the CPU 74 is not specifically limited. For example, the CPU 74 may determine the position of the boundary line on the basis of a histogram (brightness distribution) obtained as a result of the image analysis of the live preview image 100. For example, a histogram 200 of the live preview image 100 is illustrated in FIG. 9. The histogram 200 illustrated in FIG. 9 represents the brightness distribution of the live preview image 100, where the horizontal axis represents the brightness value (brightness) and the vertical axis represents the number of pixels (frequency). Hereinafter, "brightness value" may be simply referred to as "brightness".

The CPU 74 detects a range 206 that corresponds to a valley between a peak 202 and a peak 204 of the brightness value from the histogram 200 and determines one specific brightness value 208 in the detected range 206 on the basis of a predetermined condition. In the predetermined condition in this case, for example, the intermediate value in the range 206 or a brightness value for which the number of pixels is smallest is specified as the brightness value to be determined. On the basis of the positions of pixels corresponding to the determined brightness value 208, the CPU 74 needs to set a straight line that includes the largest number of pixels having a brightness value equal to the brightness value 208 as the boundary line 120 in the live preview image 100 to thereby determine the position of the boundary line 120 in the live preview image 100.

The case has been described where the histogram 200 illustrated in FIG. 9 has two portions (the peak 202 and the peak 204) that correspond to peaks of the brightness value; however, even in a case where the histogram 200 has three or more portions that correspond to peaks of the brightness value, that is, has two or more ranges 206 that correspond to valleys, the CPU 74 can determine the position of the boundary line 120 from the histogram. In this case, for example, the CPU 74 needs to determine, from among brightness values determined from the respective ranges 206 that correspond to the plurality of valleys, a brightness value that meets a predetermined condition specifying, for example, the smallest value, and determine the position of the boundary line 120 on the basis of the determined brightness value.

Another method for determining the position of the boundary line 120 may be employed in which contrasts are sequentially extracted from an end portion of the live preview image 100 on the basis of the brightness or density, and a position in which the contrast suddenly changes is determined to be the position of the boundary line 120.

In this embodiment, as the method for determining the boundary line, the form in which the CPU 74 determines the boundary line on the basis of the live preview image 100, that is, the CPU 74 automatically determines the boundary line, has been described; however, the method for determining the boundary line is not specifically limited. For example, on the basis of the position (coordinates) of a boundary line specified by, for example, the user tracing the live preview image 100 displayed on the touch panel display 29, the boundary line may be determined.

In the next step S102, the CPU 74 divides the live preview image 100 into a plurality of division regions along the boundary line 120 that has been determined. In the example illustrated in FIG. 8, the live preview image 100 is divided into two division regions, namely, a division region 122 and a division region 124 that includes an image of the moving subject 110 (hereinafter simply referred to as "moving subject 110"), along the boundary line 120.

In the next step S104, the CPU 74 attempts to detect a moving subject for each division region. In this embodiment, the CPU 74 detects the moving subject 110 from the division region 124 of the live preview image 100. From the division region 122 of the live preview image 100, no moving subject is detected.

The method for detecting the moving subject 110 from the live preview image 100 is not specifically limited. For example, the CPU 74 may derive the amount of change in position of each photographic subject from a plurality of preceding and succeeding frames of the live preview image 100 and detect a photographic subject for which the derived amount of change is equal to or larger than a threshold value as a moving subject. Alternatively, the CPU 74 may derive the amount of change in shape of each photographic subject from a plurality of preceding and succeeding frames of the live preview image 100 and detect a photographic subject for which the derived amount of change is equal to or larger than a threshold value as a moving subject.

In the next step S106, the CPU 74 determines whether a moving subject is detected. In this embodiment, in a case where the CPU 74 detects a moving subject from any one of the division regions obtained as a result of division, the result of determination in step S106 is positive. In a case where the moving subject 110 is detected from the division region 124 of the live preview image 100 as described above, the result of determination in step S106 is positive, and the flow proceeds to step S108.

In step S108, the CPU 74 performs the first process, an example of which is illustrated in FIG. 10. As illustrated in FIG. 10, in step S150, the CPU 74 derives, for each division region, the HD length X of the horizontal synchronizing signal corresponding to the control amount of the amount of exposure. In this embodiment, as the control amount of the amount of exposure is made larger, the HD length X becomes longer, and the exposure time becomes shorter. In this embodiment, as the control amount of the amount of exposure is made smaller, the HD length X becomes shorter, and the exposure time becomes longer.

The method for deriving the HD length X of the horizontal synchronizing signal by the CPU 74 is not specifically limited. For example, the CPU 74 may derive the HD length X of the horizontal synchronizing signal on the basis of the brightness of each of the division region 122 and the division region 124. In this case, for example, information indicating a correspondence between the brightness and the HD length X of the horizontal synchronizing signal may be stored in advance in the secondary storage unit 78, the average of brightness of each of the division region 122 and the division region 124 may be calculated, and the HD length X of the horizontal synchronizing signal corresponding to the calculated average may be derived from the information indicating the correspondence and stored in the secondary storage unit 78. Alternatively, for example, the CPU 74 may accept the HD length X of the horizontal synchronizing signal from the user through the accepting device 62 for each of the division region 122 and the division region 124 to derive the HD length X of the horizontal synchronizing signal for each of the division region 122 and the division region 124.

In this embodiment, for example, the division region 124 is brighter than the division region 122 (the brightness is higher). Therefore, the CPU 74 derives the HD length X for making the exposure time shorter than a predetermined reference for the division region 124 to prevent blown-out highlights, and the CPU 74 derives the HD length X for making the exposure time longer than the predetermined reference for the division region 122 to prevent blocked-up shadows.

In the next step S152, the CPU 74 outputs the horizontal synchronizing signal that includes the HD length X derived in step S150 described above to the image signal processing circuit 52 as an instruction for exposure control, and thereafter, the first process ends, and the flow proceeds to step S110 in the exposure control process.

In step S110, the CPU 74 communicates information indicating that the first process has been performed. Specifically, the CPU 74 presents to the user the fact that the first process has been performed. After presenting to the user by the CPU 74 the fact that the first process has been performed, the exposure control process ends. FIG. 11 illustrates an example state where information 114 indicating that the first process has been performed is superimposed and displayed on the live preview image 100 displayed on the touch panel display 29. In the example illustrated in FIG. 11, as the information 114, information indicating that exposure time control, which is the first process, has been performed is presented. The CPU 74 may, before performing the first process, communicate information indicating that the first process is going to be performed.

It is difficult to know, from the live preview image 100, which of the first process and the second process has been performed, and the user has difficulty in recognizing which of the processes has been performed. Accordingly, in a case where the first process has been performed, the image capturing apparatus 10 of this embodiment presents information indicating the fact to the user to thereby allow the user to easily recognize which of the processes has been performed.

The method for presenting the fact that the first process has been performed is not specifically limited. For example, a predetermined icon may be superimposed and displayed on the live preview image 100. The method for presenting the fact is not limited to the presentation method using display and, for example, the fact may be presented by using a sound or the fact may be presented by turning on an LED (light emitting diode) (not illustrated) provided on the image capturing apparatus main body 12 or making the LED blink.

In a case where the exposure control process, an example of which is illustrated in FIG. 6, including the first process is thus performed, the live preview image 100 displayed on the touch panel display 29 becomes an image obtained by the CPU 74 controlling the exposure time of the imaging device 22 for each of the division region 122 and the division region 124.

On the other hand, unlike the live preview image 100 of this embodiment, in a case where no moving subject is detected from any of the division regions of the live preview image, the result of determination in step S106 is negative, and the flow proceeds to step S112.

In step S112, the CPU 74 determines whether an instruction for performing the first process is accepted. In this embodiment, in a case where an instruction for performing the first process is accepted in advance from the user through the accepting device 62, the first process is performed even in a case where no moving subject is detected from any division region. Accordingly, in a case where the accepting device 62 accepts an instruction for performing the first process, the result of determination in step S112 is positive, and the flow proceeds to step S108. On the other hand, in a case where the accepting device 62 does not accept an instruction for performing the first process, the result of determination in step S112 is negative, and the flow proceeds to step S114.

In step S114, the CPU 74 performs the second process, an example of which is illustrated in FIG. 12. As illustrated in FIG. 12, in step S170, the CPU 74 derives, for each division region, the filter factor of the ND filter 80 corresponding to the control amount of the amount of exposure. In this embodiment, as the control amount of the amount of exposure is made larger, the exposure control process becomes more effective, and the light transmittance of the ND filter 80 decreases. In this case, a blown-out-highlights prevention effect is enhanced. In this embodiment, as the control amount of the amount of exposure is made smaller, the exposure control process becomes less effective, and the light transmittance of the ND filter 80 increases. In this case, a blocked-up-shadows prevention effect is enhanced.

The method for deriving the filter factor of the ND filter 80 by the CPU 74 is not specifically limited. For example, the method may be similar to the method for deriving the HD length X in the first process in step S108 described above. Specifically, the CPU 74 may derive the filter factor of the ND filter 80 on the basis of the brightness of each of the division region 122 and the division region 124. In this case, for example, information indicating a correspondence between the brightness and the filter factor of the ND filter 80 may be stored in advance in the secondary storage unit 78, the average of brightness of each of the division region 122 and the division region 124 may be calculated, and the filter factor of the ND filter 80 corresponding to the calculated average may be derived from the information indicating the correspondence and stored in the secondary storage unit 78. Alternatively, for example, the CPU 74 may accept the filter factor of the ND filter 80 from the user through the accepting device 62 for each of the division region 122 and the division region 124 to derive the filter factor of the ND filter 80 for each of the division region 122 and the division region 124.

For example, a case is assumed where the moving subject 110 is not included (not present) in the live preview image 100. The division region 124 is brighter than the division region 122 (the brightness is higher). Therefore, the CPU 74 derives the filter factor for making the light transmittance of the ND filter 80 lower than a predetermined reference for the division region 124 to prevent blown-out highlights, and the CPU 74 derives the filter factor for making the light transmittance of the ND filter 80 higher than the predetermined reference for the division region 122 to prevent blocked-up shadows.

In the next step S172, the CPU 74 outputs to the ND filter driving unit 82 an instruction for controlling exposure by driving the ND filter 80 in accordance with the filter factor of the ND filter 80 derived in step S170 described above, and thereafter, the second process ends and the exposure control process ends.

In a case where the second process, an example of which is illustrated in FIG. 12, is thus performed, the live preview image 100 displayed on the touch panel display 29 becomes an image obtained by the CPU 74 controlling the light transmittance of the ND filter 80 for each of the division region 122 and the division region 124.

In a case where the exposure control process is thus performed, the live preview image 100 displayed on the touch panel display 29 becomes an image obtained by the CPU 74 controlling the amount of exposure of the imaging device 22. Thereafter, in a case where an instruction for image capturing is given by the user using the release button 26, a captured image obtained with the amount of exposure controlled by the CPU 74 is recorded to the memory card 66.

As described above, in the image capturing apparatus 10 of this embodiment, the CPU 74 determines whether a moving subject is included in the live preview image. In a case where the CPU 74 determines that a moving subject is included, the CPU 74 controls the HD length of the horizontal synchronizing signal for each division region to thereby perform the first process for controlling the exposure time of the imaging device 22 for each row of the array of the pixels 90. In a case where the CPU 74 determines that no moving subject is included in the live preview image, the CPU 74 performs the second process for controlling the light transmittance of the ND filter 80 for each division region.

In a case of controlling the light transmittance of the ND filter 80 to thereby control the amount of exposure of the imaging device 22, the exposure time is derived in accordance with the brightness of a division region having the lowest brightness among the plurality of division regions. For example, in the live preview image 100, the brightness of the division region 122 is lower than that of the division region 124, that is, the division region 122 is darker, and therefore, the exposure time that corresponds to the brightness of the division region 122 is derived. Accordingly, in a case of controlling the light transmittance of the ND filter 80, the exposure time tends to be longer. As the exposure time is longer, the moving subject is more likely to be blurred.

As described above, in the image capturing apparatus 10 of this embodiment, in the case where a moving subject is included in the live preview image, not the second process for controlling the light transmittance of the ND filter 80 but the first process for controlling the exposure time of the imaging device 22 for each row of the array of the pixels 90 is performed. Specifically, the CPU 74 makes the exposure time of a brighter division region shorter in the first process to thereby control the amount of exposure. Accordingly, blurring of the moving subject can be suppressed.

Therefore, with the image capturing apparatus 10 of this embodiment, the image quality of an image of a moving subject can be improved.

Second Embodiment

A second embodiment will be described in detail below. In this embodiment, components the same as those described in the first embodiment described above are assigned the same reference numerals, and descriptions thereof will be omitted.

For example, as illustrated in FIG. 1 to FIG. 3, an image capturing apparatus 10A of this embodiment is different from the image capturing apparatus 10 of the first embodiment described above in that the image capturing apparatus 10A has an image capturing apparatus main body 12A instead of the image capturing apparatus main body 12.

For example, as illustrated in FIG. 3, the image capturing apparatus main body 12A is different from the image capturing apparatus main body 12 in that the image capturing apparatus main body 12A has a control unit 46A instead of the control unit 46. The control unit 46A is different from the control unit 46 in that the control unit 46A has a secondary storage unit 78A instead of the secondary storage unit 78.

For example, as illustrated in FIG. 3, the secondary storage unit 78A is different from the secondary storage unit 78 in that the secondary storage unit 78A stores an exposure control process program 79A instead of the exposure control process program 79. The CPU 74 reads from the secondary storage unit 78A and loads to the primary storage unit 76 the exposure control process program 79A, and performs an exposure control process illustrated in FIG. 13 in accordance with the loaded exposure control process program 79A. The CPU 74 executes the exposure control process program 79A to thereby operate as the determination unit and the amount-of-exposure control unit of the present disclosure.

Now, as the operations of the image capturing apparatus 10A of this embodiment, the exposure control process illustrated in FIG. 13 will be described. For an operation the same as that in the first embodiment described above, a description thereof will be omitted.

As illustrated in FIG. 13, the exposure control process of this embodiment is different from the exposure control process (see FIG. 6) of the first embodiment described above in that the process in step S107 is performed between step S106 and step S108. In the exposure control process of this embodiment, in a case where a moving subject is detected from any one of the division regions obtained as a result of division, the result of determination in step S106 is positive, and the flow proceeds to step S107.

In step S107, the CPU 74 determines whether a moving-subject region, which is the division region in which an image of a moving subject is determined to be included, is a bright region. Here, "bright region" may be a region having a predetermined brightness, specifically, having a brightness equal to or higher than a predetermined brightness or may be a region brighter than the other division regions obtained by dividing the live preview image.

In a case where the division region from which a moving subject is detected is a bright region, the result of determination in step S107 is positive, and the flow proceeds to step S108. In the example illustrated in FIG. 8, the division region 124 of the live preview image 100 is a bright region and the division region 124 includes the moving subject 110, and therefore, the result of determination in step S107 is positive.

On the other hand, in a case where the division region from which a moving subject is detected is not a bright region, the result of determination in step S107 is negative, and the flow proceeds to step S112.

As described above, in the image capturing apparatus 10A of this embodiment, in the case where the division region from which a moving subject is detected is a bright region, the first process for controlling the exposure time of the imaging device 22 for each row of the array of the pixels 90 is performed. In the image capturing apparatus 10A of this embodiment, even in the case where a moving subject is detected, in a case where the division region from which the moving subject is detected is not a bright region, the second process for controlling the light transmittance of the ND filter 80 is performed on condition that an instruction for performing the first process is not accepted.

Even in a case where any of the first process for controlling the exposure time of the imaging device 22 for each row of the array of the pixels 90 and the second process for controlling the light transmittance of the ND filter 80 is performed, the exposure time of a dark division region is the same. Accordingly, in a case where a moving subject is included in the dark division region, even in the case of performing any of the first process and the second process, it is regarded that the moving subject is blurred similarly.

In the first process, a limitation is imposed, that is, the exposure time is controlled in units of rows of the array of the pixels 90 as described above. On the other hand, in the second process, the light transmittance of the ND filter 80 can be controlled in units corresponding to the resolution. Therefore, in general, the resolution for controlling exposure of the imaging device 22 is higher in the second process than in the first process.

Therefore, with the image capturing apparatus 10A of this embodiment, even in the case where a moving subject is detected, in a case where the division region is not a bright region, the resolution for controlling exposure of the imaging device 22 can be made higher.

Third Embodiment

A third embodiment will be described in detail below. In this embodiment, components the same as those described in the first embodiment described above are assigned the same reference numerals, and descriptions thereof will be omitted.

For example, as illustrated in FIGs. 1 to FIG. 3, an image capturing apparatus 10B of this embodiment is different from the image capturing apparatus 10 of the first embodiment described above in that the image capturing apparatus 10B has an image capturing apparatus main body 12B instead of the image capturing apparatus main body 12.

For example, as illustrated in FIG. 3, the image capturing apparatus main body 12B is different from the image capturing apparatus main body 12 in that the image capturing apparatus main body 12B has a control unit 46B instead of the control unit 46. The control unit 46B is different from the control unit 46 in that the control unit 46B has a secondary storage unit 78B instead of the secondary storage unit 78.

For example, as illustrated in FIG. 3, the secondary storage unit 78B is different from the secondary storage unit 78 in that the secondary storage unit 78B stores an exposure control process program 79B instead of the exposure control process program 79. The CPU 74 reads from the secondary storage unit 78B and loads to the primary storage unit 76 the exposure control process program 79B, and performs an exposure control process illustrated in FIG. 14 in accordance with the loaded exposure control process program 79B. The CPU 74 executes the exposure control process program 79B to thereby operate as the determination unit and the amount-of-exposure control unit of the present disclosure.

Now, as the operations of the image capturing apparatus 10B of this embodiment, the exposure control process illustrated in FIG. 14 will be described. For an operation the same as that in the first embodiment described above, a description thereof will be omitted.

Figure 14:
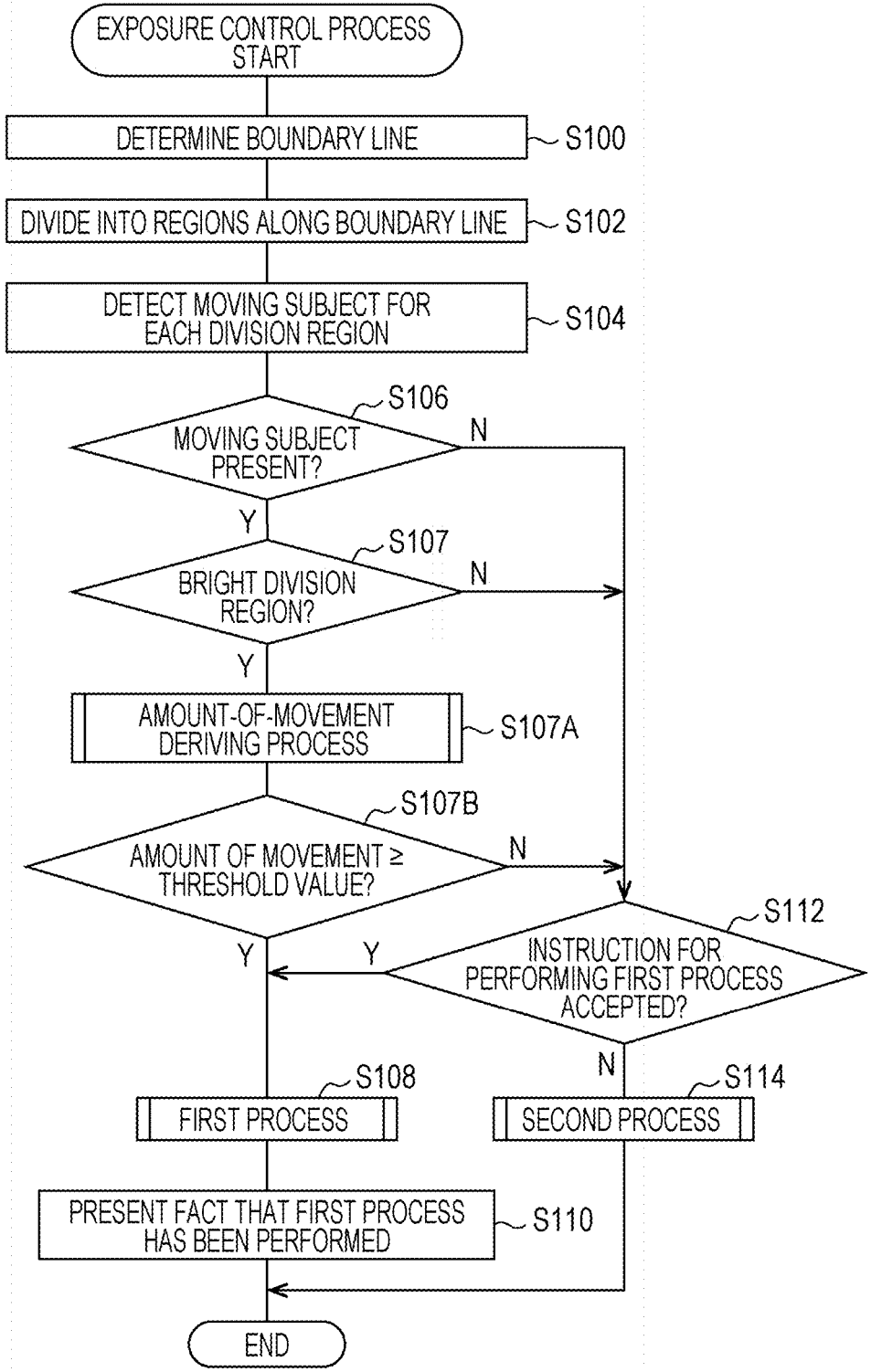
FIG. 14 is a flowchart illustrating an example flow of an exposure control process according to the third embodiment.

As illustrated in FIG. 14, the exposure control process of this embodiment is different from the exposure control process (see FIG. 6) of the first embodiment described above in that the process in step S107, step S107A, and step S107B is performed between step S106 and step S108. The process in step S107 is similar to that in the exposure control process (see FIG. 13) of the second embodiment, and therefore, a description thereof will be omitted. In the exposure control process of this embodiment, in a case where a division region from which a moving subject is detected is a bright region, the result of determination in step S107 is positive, and the flow proceeds to step S107A.

Figure 15:
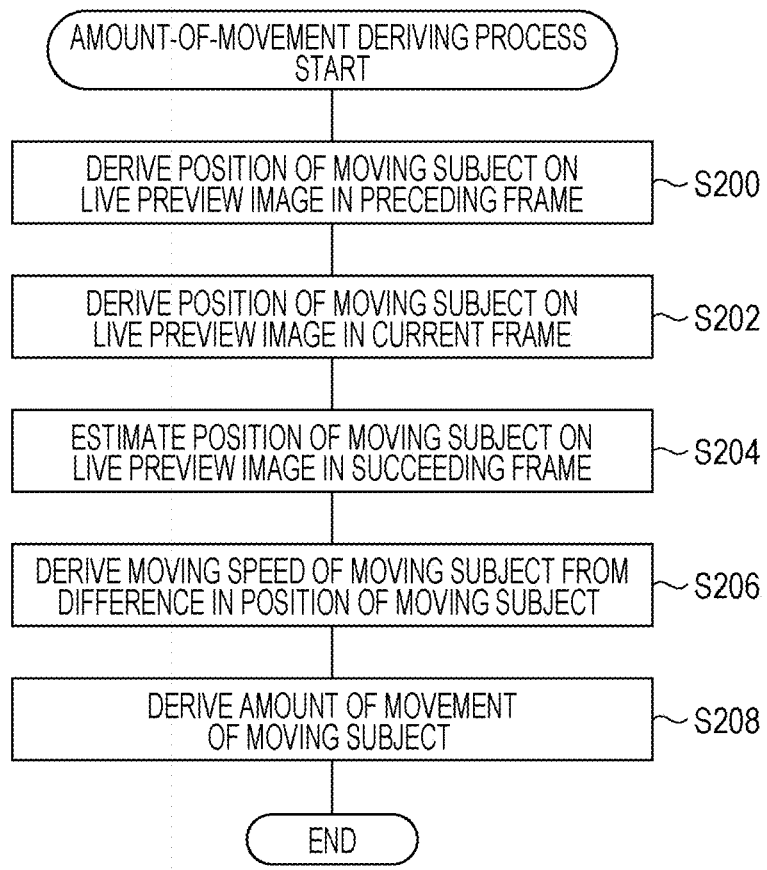
FIG. 15 is a flowchart illustrating an example flow of an amount-of-movement deriving process.

In step S107A, the CPU 74 performs an amount-of-movement deriving process, an example of which is illustrated in FIG. 15, to thereby derive the amount of movement of the moving subject.

As illustrated in FIG. 15, in step S200, the CPU 74 derives the position of the moving subject on the live preview image in the preceding frame. The method for deriving the position of the moving subject on the live preview image by the CPU 74 is not specifically limited. For example, a method similar to the method for detecting a moving subject for each division region in step S104 in the exposure control process described above may be used.

In the next step S202, the CPU 74 derives the position of the moving subject on the live preview image in the frame (current frame) currently displayed on the touch panel display 29, in a manner similar to step S200 described above.

In the next step S204, the CPU 74 estimates the position of the moving subject on the live preview image in the succeeding frame on the basis of the position of the moving subject in the preceding frame derived in step S200 described above and the position of the moving subject in the current frame derived in step S202 described above.

In the next step S206, the CPU 74 derives the moving speed of the moving subject from the difference in position of the moving subject. Specifically, the CPU 74 derives the difference between the position of the moving subject derived in step S200 and the position of the moving subject derived in step S202 to thereby derive the difference in position of the moving subject between the preceding frame and the current frame. Then, the CPU 74 divides the derived difference by the interval period of the frame rate to thereby derive the moving speed between the preceding frame and the current frame. Further, the CPU 74 derives the difference between the position of the moving subject derived in step S202 and the position of the moving subject estimated in step S204 to thereby derive the difference in position of the moving subject between the current frame and the succeeding frame. Then, the CPU 74 divides the derived difference by the interval period of the frame rate to thereby derive the moving speed of the moving subject between the current frame and the succeeding frame. Further, the CPU 74 derives the average of the two derived moving speeds between the frames as the moving speed of the moving subject.

The CPU 74 may derive the difference between the position of the moving subject derived in step S200 and the position of the moving subject estimated in step S204 to thereby derive the difference in position of the moving subject between the preceding frame and the succeeding frame. Then, the CPU 74 may divide the derived difference by a value twice the interval period of the frame rate to thereby derive the moving speed between the preceding frame and the succeeding frame as the moving speed of the moving subject.

In the next step S208, the CPU 74 derives the amount of movement of the moving subject on the basis of the moving speed of the moving subject derived in step S206 described above, and thereafter, the amount-of-movement deriving process ends. Specifically, the CPU 74 multiples the derived moving speed of the moving subject by the shutter speed in image capturing in the preceding frame and the current frame to thereby derive the amount of movement of the moving subject. In a case where the amount-of-movement deriving process ends, the flow proceeds to step S107B in the exposure control process.

In step S107B, the CPU 74 determines whether the derived amount of movement is equal to or larger than a predetermined threshold value, that is, the amount of movement of the moving subject per unit time is equal to or larger than a predetermined amount of movement. A case where the amount of movement of a moving subject is large is a case where the moving speed of the moving subject is fast. As the moving speed is faster, the moving subject is more likely to be blurred. In the image capturing apparatus 10B of this embodiment, the first process is performed in the case where the moving speed of the moving subject is fast and the moving subject is likely to be blurred to thereby suppress blurring of the moving subject.

The threshold value used in the determination needs to be specified in advance in accordance with, for example, the degree of blurring of a moving subject in captured images obtained in advance by performing an experiment or the like or in accordance with desired image quality (an allowable range of blurring of a moving subject). The threshold value used in the determination may be set by the user.

In a case where the amount of movement of the moving subject is equal to or larger than the threshold value, the result of determination in step S107B is positive, the flow proceeds to step S108, and the CPU 74 performs the first process. On the other hand, in a case where the amount of movement of the moving subject is smaller than the threshold value, the result of determination in step S107B is negative, and the flow proceeds to step S112. In this case, the CPU 74 performs the first process or the second process in accordance with the result of determination in step S112.

As described above, in the image capturing apparatus 10B of this embodiment, in the case where the amount of movement of the detected moving subject is equal to or larger than the threshold value, the first process for controlling the exposure time of the imaging device 22 for each row of the array of the pixels 90 is performed. In the image capturing apparatus 10B of this embodiment, even in the case where a moving subject is detected, in the case where the amount of movement of the moving subject is smaller than the threshold value, the second process for controlling the light transmittance of the ND filter 80 is performed on condition that an instruction for performing the first process is not accepted.

Therefore, with the image capturing apparatus 10B of this embodiment, even in the case where a moving subject is detected, in the case where the amount of movement of the moving subject is smaller than the threshold value, that is, in a case where, for example, the moving subject is blurred within the allowable range, the resolution for controlling exposure of the imaging device 22 can be made higher.

Figure 16:
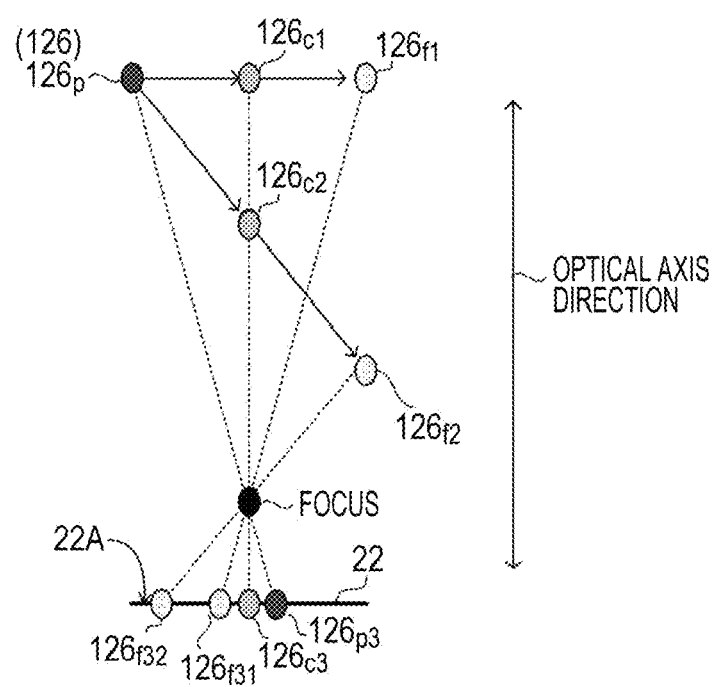
FIG. 16 is a diagram for explaining deriving of the amount of movement.

The method for deriving the amount of movement is not limited to that in the amount-of-movement deriving process (see FIG. 15) described above. Deriving of the amount of movement of a moving subject in this embodiment will be described below with reference to FIG. 16. The amount-of-movement deriving process described above with reference to FIG. 15 is the deriving method under the assumption that the moving subject moves in a direction crossing the optical-axis direction (does not move in the optical-axis direction). FIG. 16 illustrates example positions of a moving subject 126 in a case where the moving subject 126 moves in a direction crossing the optical-axis direction (hereinafter referred to as "first movement") as a moving subject $126_p$, a moving subject $126_{c1}$, and moving subject $126_{f1}$ in the order of movement.

In a case where the moving subject performs the first movement as described above, in the preceding frame, an image of the moving subject $126_p$ is captured, and the image of the moving subject $126_p$ is formed on the photosensitive surface 22A of the imaging device 22 as a formed image $126_{p3}$. In the current frame, an image of the moving subject $126_{c1}$ is captured, and the image of the moving subject $126_{c1}$ is formed on the photosensitive surface 22A of the imaging device 22 as a formed image $126_{c3}$. In the succeeding frame, an image of the moving subject $126_{f1}$ is captured, and the image of the moving subject $126_{f1}$ is formed on the photosensitive surface 22A of the imaging device 22 as a formed image $126_{f31}$.

However, the movement direction of the moving subject is not limited to the direction crossing the optical-axis direction, and actually, the moving subject also moves in the optical-axis direction (hereinafter referred to as "second movement"). FIG. 16 illustrates example positions of the moving subject 126 in a case where the moving subject 126 performs the second movement as the moving subject $126_p$, a moving subject $126_{c2}$, and a moving subject $126_{f2}$ in the order of movement.

In the case where the moving subject performs the second movement as described above, in the preceding frame, an image of the moving subject $126_p$ is captured, and the image of the moving subject $126_p$ is formed on the photosensitive surface 22A of the imaging device 22 as the formed image $126_{p3}$. In the current frame, an image of the moving subject $126_{c2}$ is captured, and the image of the moving subject $126_{c2}$ is formed on the photosensitive surface 22A of the imaging device 22 as the formed image $126_{c3}$. In the succeeding frame, an image of the moving subject $126_{f2}$ is captured, and the image of the moving subject $126_{f2}$ is formed on the photosensitive surface 22A of the imaging device 22 as a formed image $126_{f32}$.

As illustrated in FIG. 16, in the first movement and the second movement, the position at which the image of the moving subject 126 is formed in the preceding frame and the current frame is the same. Therefore, the position of the moving subject on the live preview image 100 in the preceding frame and the current frame is the same in the first movement and the second movement. However, the position at which the image of the moving subject 126 is formed in the succeeding frame differs between the first movement and the second movement. Therefore, the position of the moving subject on the live preview image 100 in the succeeding frame differs between the first movement and the second movement.

As a consequence, with the amount-of-movement deriving process illustrated in FIG. 15, the position of the moving subject on the live preview image 100 in the succeeding frame might not be accurately estimated. An amount-of-movement deriving process with which the position of a moving subject on the live preview image 100 in the succeeding frame can be more accurately estimated in the case where the moving subject also moves in the optical-axis direction as in the second movement described above will be described with reference to FIG. 17, which illustrates an example of the amount-of-movement deriving process.

Figure 17:
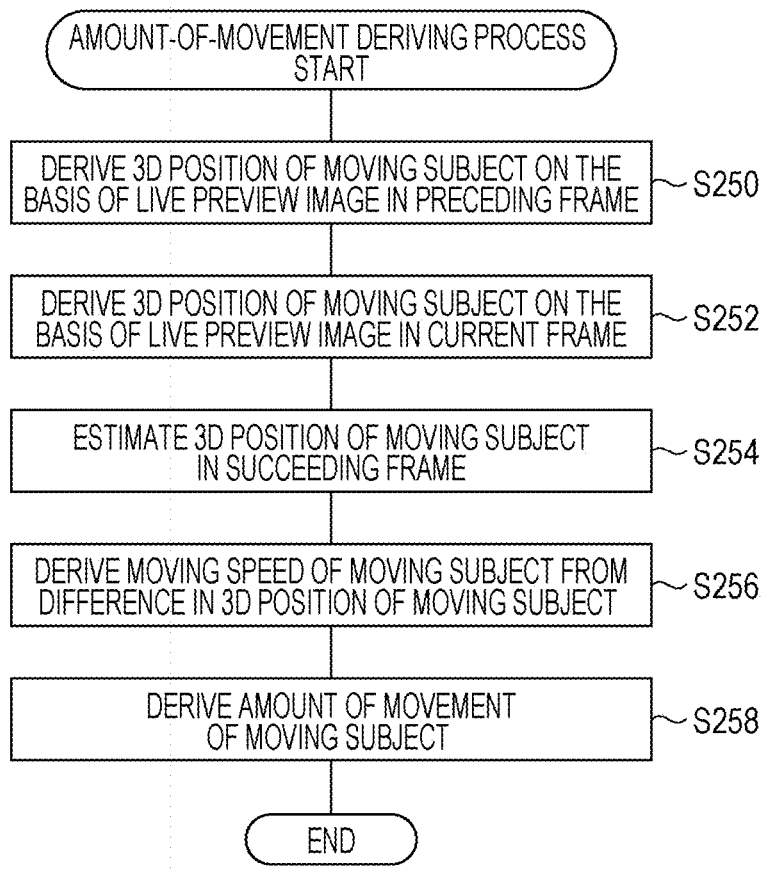
FIG. 17 is a flowchart illustrating another example flow of the amount-of-movement deriving process.

As illustrated in FIG. 17, in step S250, the CPU 74 derives the position (three-dimensional position) of the moving subject in three dimensions on the basis of the live preview image in the preceding frame. Specifically, the CPU 74 derives the three-dimensional position of the moving subject from the position of the moving subject on the live preview image, the distance in the depth direction (optical-axis direction), and the focal length of the image capturing apparatus 10B. The distance in the depth direction needs to be derived by measurement using a phase difference method.

In the next step S252, the CPU 74 derives the three-dimensional position of the moving subject on the basis of the live preview image in the current frame in a manner similar to step S250 described above.

In the next step S254, the CPU 74 estimates the three-dimensional position of the moving subject in the succeeding frame on the basis of the three-dimensional position of the moving subject in the preceding frame derived in step S250 described above and the three-dimensional position of the moving subject in the current frame.

In the next step S256, the CPU 74 derives the moving speed of the moving subject from the difference in three-dimensional position of the moving subject. Specifically, the CPU 74 derives the difference between the three-dimensional position of the moving subject derived in step S250 and the three-dimensional position of the moving subject derived in step S252 to thereby derive the difference in three-dimensional position of the moving subject between the preceding frame and the current frame. Then, the CPU 74 divides the derived difference by the interval period of the frame rate to thereby derive the moving speed between the preceding frame and the current frame. Further, the CPU 74 derives the difference between the three-dimensional position of the moving subject derived in step S252 and the three-dimensional position of the moving subject estimated in step S254 to thereby derive the difference in three-dimensional position of the moving subject between the current frame and the succeeding frame. Then, the CPU 74 divides the derived difference by the interval period of the frame rate to thereby derive the moving speed of the moving subject between the current frame and the succeeding frame. Further, the CPU 74 derives the average of the two derived moving speeds between the frames as the moving speed of the moving subject. The CPU 74 may derive the difference between the three-dimensional position of the moving subject derived in step S250 and the three-dimensional position of the moving subject estimated in step S254 to thereby derive the difference in three-dimensional position of the moving subject between the preceding frame and the succeeding frame. Then, the CPU 74 may divide the derived difference by a value twice the interval period of the frame rate to thereby derive the moving speed between the preceding frame and the succeeding frame as the moving speed of the moving subject.

In the next step S258, the CPU 74 derives the amount of movement of the moving subject on the basis of the moving speed of the moving subject derived in step S256 described above, and thereafter, the amount-of-movement deriving process ends. The CPU 74 derives the amount of movement of the moving subject from the derived moving speed of the moving subject, the shutter speed in image capturing in the preceding frame and the current frame, the three-dimensional position of the moving subject in the succeeding frame, and the focal length.

As described above, in the amount-of-movement deriving process illustrated in FIG.

17, the amount of movement of a moving subject is derived on the basis of the three-dimensional position of the moving subject, and therefore, the amount of movement can be derived more accurately.

Instead of the amount of movement, in step S107B, the CPU 74 may determine whether the moving speed of the moving subject is equal to or faster than a predetermined speed. However, the amount of movement of the moving subject derived in the above-described amount-of-movement deriving process also takes into consideration the shutter speed of the image capturing apparatus 10B, and therefore, the use of the amount of movement is more preferable than the use of the moving speed.

Fourth Embodiment

A fourth embodiment will be described in detail below. In this embodiment, components the same as those described in the first embodiment described above are assigned the same reference numerals, and descriptions thereof will be omitted.

For example, as illustrated in FIG. 1 to FIG. 3, an image capturing apparatus 10C of this embodiment is different from the image capturing apparatus 10 of the first embodiment described above in that the image capturing apparatus 10C has an image capturing apparatus main body 12C instead of the image capturing apparatus main body 12.

For example, as illustrated in FIG. 3, the image capturing apparatus main body 12C is different from the image capturing apparatus main body 12 in that the image capturing apparatus main body 12C has a control unit 46C instead of the control unit 46. The control unit 46C is different from the control unit 46 in that the control unit 46C has a secondary storage unit 78C instead of the secondary storage unit 78.

For example, as illustrated in FIG. 3, the secondary storage unit 78C is different from the secondary storage unit 78 in that the secondary storage unit 78C stores an exposure control process program 79C instead of the exposure control process program 79. The CPU 74 reads from the secondary storage unit 78C and loads to the primary storage unit 76 the exposure control process program 79C, and performs an exposure control process illustrated in FIG. 18 in accordance with the loaded exposure control process program 79C. The CPU 74 executes the exposure control process program 79C to thereby operate as the determination unit and the amount-of-exposure control unit of the present disclosure.

Now, as the operations of the image capturing apparatus 10C of this embodiment, the exposure control process illustrated in FIG. 18 will be described. For an operation the same as that in the first embodiment described above, a description thereof will be omitted.

Figure 18:
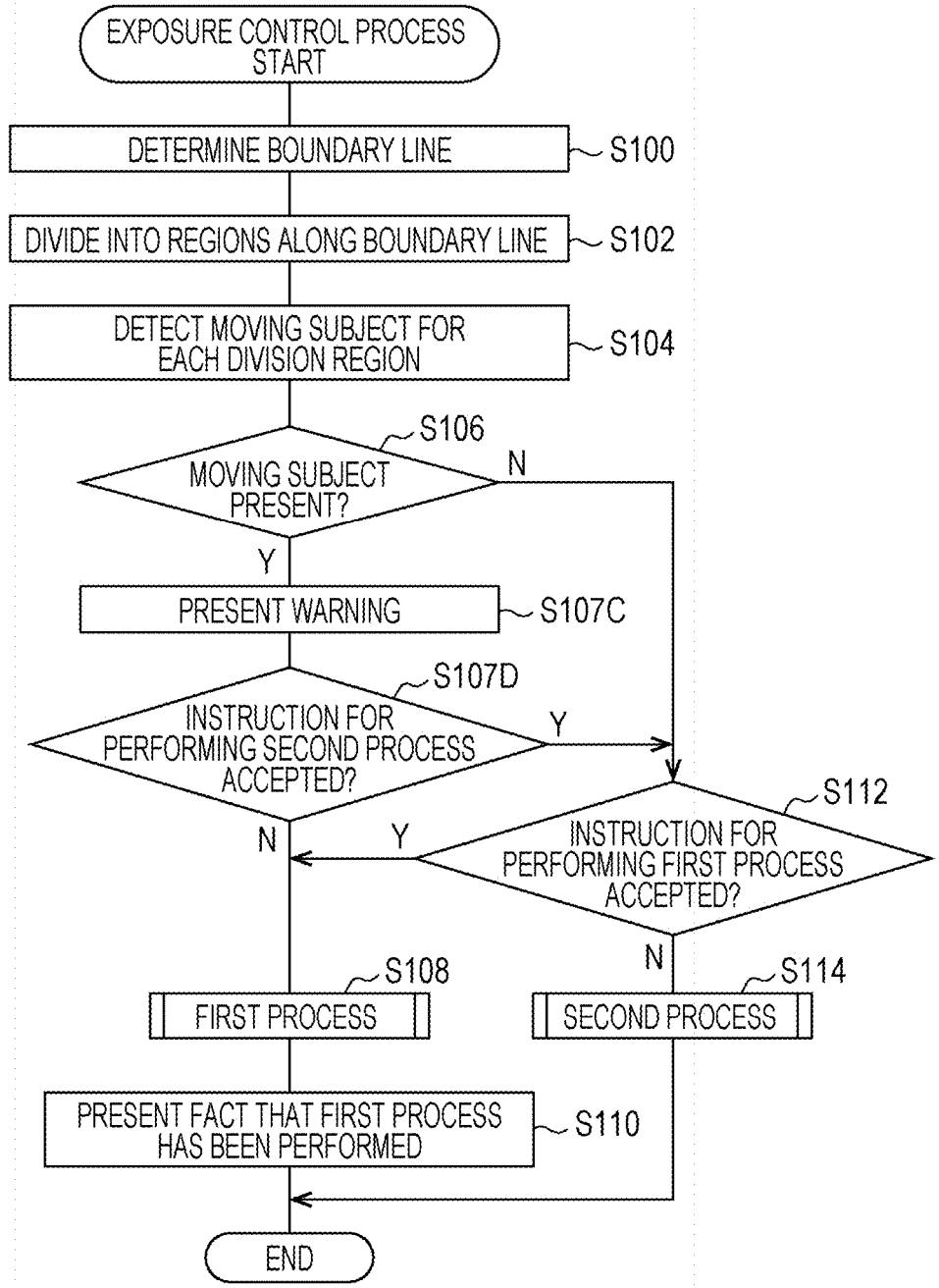
FIG. 18 is a flowchart illustrating an example flow of an exposure control process according to the fourth embodiment.

As illustrated in FIG. 18, the exposure control process of this embodiment is different from the exposure control process (see FIG. 6) of the first embodiment described above in that the process in step S107C and step S107D is performed between step S106 and step S108. In the exposure control process of this embodiment, in the case where a moving subject is detected from a division region, the result of determination in step S106 is positive, and the flow proceeds to step S107C.

Figure 19:
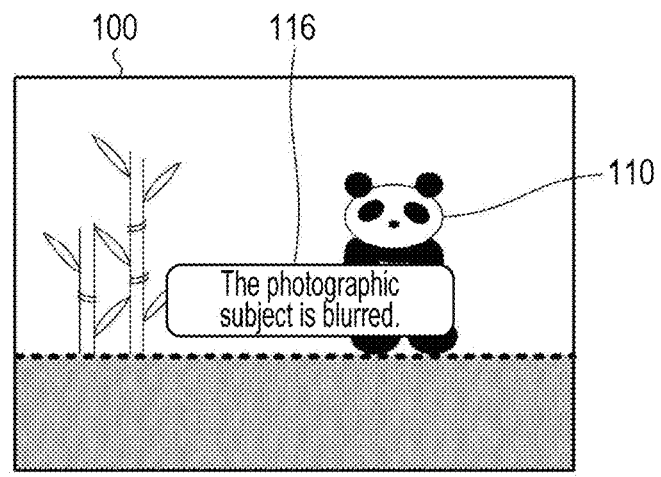
FIG. 19 is a diagram for explaining presentation of a warning.

In step S107C, the CPU 74 communicates predetermined information. Specifically, the CPU 74 presents information indicating a warning about blurring of the moving subject to the user. FIG. 19 illustrates an example state where information 116 indicating a warning about blurring of the moving subject is superimposed and displayed on the live preview image 100 displayed on the touch panel display 29.

In this embodiment, in a case where an instruction for performing the second process is accepted in advance from the user through the accepting device 62, even in the case where a moving subject is detected from a division region, the second process is performed. However, performing of the second process may result in blurring of the moving subject. Accordingly, in this embodiment, a warning about blurring of the moving subject is given to thereby allow the user to cancel the instruction for performing the second process and make the first process be performed.

In the next step S107D, the CPU 74 determines whether an instruction for performing the second process is accepted by the accepting device 62. In a case where the accepting device 62 does not accept an instruction for performing the second process or in a case where an instruction for performing the second process is cancelled, the result of determination in step S107D is negative, the flow proceeds to step S108, and the CPU 74 performs the first process.

On the other hand, in a case where an instruction for performing the second process is accepted or an instruction for performing the second process is not cancelled, the result of determination in step S107D is positive, the flow proceeds to step S112, and the CPU 74 performs the second process for controlling the light transmittance of the ND filter 80 on condition that an instruction for performing the first process is not accepted.

As described above, in the image capturing apparatus 10C of this embodiment, in the case where a moving subject is detected from a division region, a warning is presented to the user. Therefore, the user can determine whether to perform the first process or the second process to control exposure by taking into consideration possible blurring of the moving subject. Accordingly, with the image capturing apparatus 10C of this embodiment, the user is provided with increased flexibility.

Fifth Embodiment

A fifth embodiment will be described in detail below. In this embodiment, components the same as those described in the first embodiment described above are assigned the same reference numerals, and descriptions thereof will be omitted.

For example, as illustrated in FIG. 1 to FIG. 3, an image capturing apparatus 10D of this embodiment is different from the image capturing apparatus 10 of the first embodiment described above in that the image capturing apparatus 10D has an image capturing apparatus main body 12D instead of the image capturing apparatus main body 12.

For example, as illustrated in FIG. 3, the image capturing apparatus main body 12D is different from the image capturing apparatus main body 12 in that the image capturing apparatus main body 12D has a control unit 46D instead of the control unit 46. The control unit 46D is different from the control unit 46 in that the control unit 46D has a secondary storage unit 78D instead of the secondary storage unit 78.

For example, as illustrated in FIG. 3, the secondary storage unit 78D is different from the secondary storage unit 78 in that the secondary storage unit 78D stores an exposure control process program 79D instead of the exposure control process program 79. The CPU 74 reads from the secondary storage unit 78D and loads to the primary storage unit 76 the exposure control process program 79D, and performs an exposure control process illustrated in FIG. 20 in accordance with the loaded exposure control process program 79D. The CPU 74 executes the exposure control process program 79D to thereby operate as the determination unit and the amount-of-exposure control unit of the present disclosure.

Now, as the operations of the image capturing apparatus 10D of this embodiment, the exposure control process illustrated in FIG. 20 will be described. For an operation the same as that in the first embodiment described above, a description thereof will be omitted.

Figure 20:
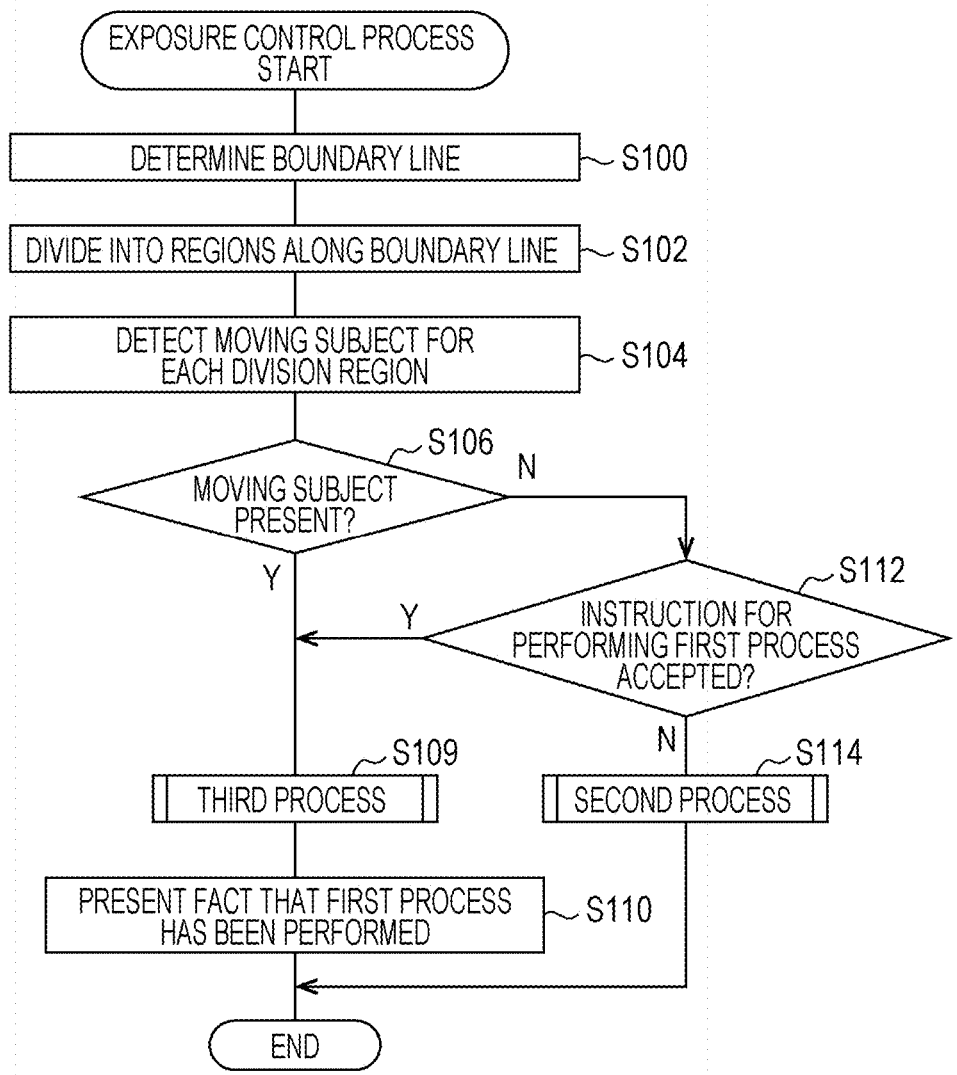
FIG. 20 is a flowchart illustrating an example flow of an exposure control process according to the fifth embodiment.

As illustrated in FIG. 20, the exposure control process of this embodiment is different from the exposure control process (see FIG. 6) of the first embodiment described above in that the process in step S109 is performed instead of the process in step S108. In the exposure control process of this embodiment, in the case where a moving subject is detected from a division region, the result of determination in step S106 is positive, and the flow proceeds to step S109.

Figure 21:
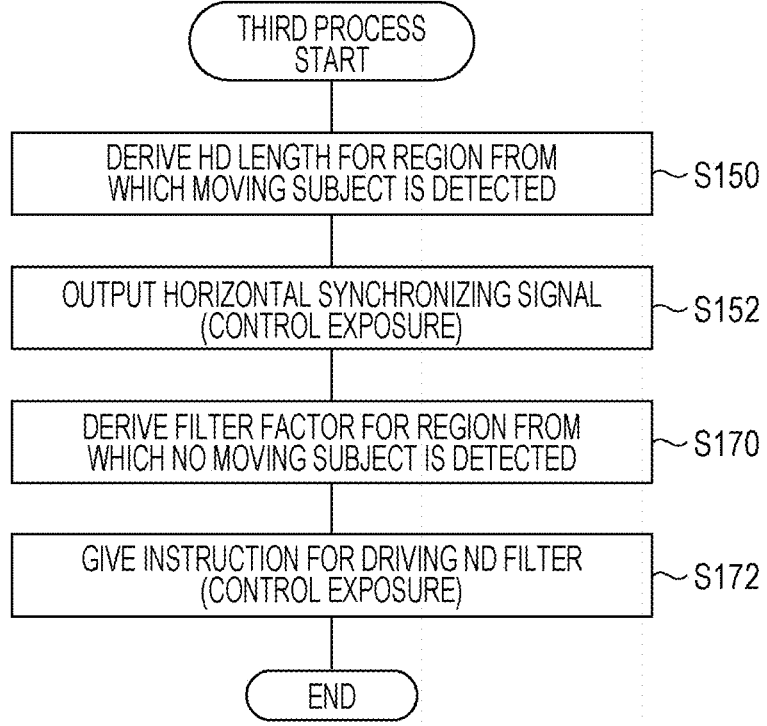
FIG. 21 is a flowchart illustrating an example flow of a third process.

In step S109, the CPU 74 performs a third process, an example of which is illustrated in FIG. 21. As illustrated in FIG. 21, the third process is a process that is a combination of the first process and the second process described above.

In step S150, the CPU 74 derives the HD length X of the horizontal synchronizing signal corresponding to the control amount of the amount of exposure for the division region from which the moving subject is detected. In the case of the live preview image 100, the CPU 74 derives the HD length X of the horizontal synchronizing signal for the division region 124. For a division region from which no moving subject is detected, that is, for the division region 122 in the case of the live preview image 100, the HD length X remains equal to a specified HD length n.

In the next step S152, the CPU 74 outputs the horizontal synchronizing signal that includes the HD length X derived in step S150 described above to the image signal processing circuit 52 as an instruction for exposure control.

In the next step S170, the CPU 74 derives the filter factor of the ND filter 80 corresponding to the control amount of the amount of exposure for a division region from which no moving subject is detected. In the case of the live preview image 100, the CPU 74 derives the filter factor for the division region 122. For the division region from which the moving subject is detected, that is, for example, for the division region 124 in the case of the live preview image 100, the CPU 74 derives the filter factor under the assumption that the light transmittance of the ND filter 80 is not controlled.

In the next step S172, the CPU 74 outputs to the ND filter driving unit 82 an instruction for controlling exposure by driving the ND filter 80 in accordance with the filter factor of the ND filter 80 derived in step S170 described above, and thereafter, the third process ends.

As described above, in the image capturing apparatus 10D of this embodiment, the first process for controlling the exposure time of the imaging device 22 for each row of the array of the pixels 90 is performed for a division region from which a moving subject is detected, and the second process for controlling the light transmittance of the ND filter 80 is performed for a division region from which no moving subject is detected. The CPU 74 need not control the amount of exposure of the imaging device 22 for a division region from which no moving subject is detected.

Accordingly, with the image capturing apparatus 10D of this embodiment, the amount of exposure of the imaging device 22 can be controlled for each division region by performing an appropriate process.

As described above, the image capturing apparatuses 10 (10A, 10B, 10C, and 10D) of the above-described embodiments include: the image capturing unit that includes the imaging device 22 in which the plurality of pixels 90 are arranged in a two-dimensional array and that outputs an image signal obtained by image capturing of a photographic subject by the imaging device 22 through the image capturing optical system; the image processing unit 56 that generates a captured image based on the image signal; and the CPU 74 that functions as the determination unit that performs the exposure control process to determine whether an image of a moving subject is included in the captured image and as the amount-of-exposure control unit that controls the amount of exposure of the imaging device 22 by performing the first process for controlling the exposure time of the imaging device 22 for each row of the array of the plurality of pixels 90 in a case where the determination unit determines that an image of a moving subject is included in the captured image, and that controls the amount of exposure of the imaging device 22 by performing the second process different from the first process in a case where the determination unit determines that no moving-subject image is included in the captured image.

As described above, in the case where a moving subject is included in the live preview image, the image capturing apparatuses 10 (10A, 10B, 10C, and 10D) of the above-described embodiments perform the first process for controlling the exposure time of the imaging device 22 for each row of the array of the pixels 90. Therefore, with the image capturing apparatuses 10 (10A, 10B, 10C, and 10D) of the above-described embodiments, the exposure time suitable to the moving subject can be set, and blurring of the moving subject can be suppressed. Accordingly, the image quality of the image of the moving subject can be improved.

For convenience of description, the image capturing apparatuses 10, 10A, 10B, 10C, and 10D are hereinafter referred to as "image capturing apparatus" without the reference numerals in a case where the image capturing apparatuses need not be distinguished from each other. For convenience of description, the image capturing apparatus main bodies 12, 12A, 12B, 12C, and 12D are hereinafter referred to as "image capturing apparatus main body" without the reference numerals in a case where the image capturing apparatus main bodies need not be distinguished from each other. For convenience of description, the secondary storage units 78, 78A, 78B, 78C, and 78D are hereinafter referred to as "secondary storage unit" without the reference numerals in a case where the secondary storage units need not be distinguished from each other. Further, for convenience of description, in a case where the exposure control process programs 79, 79A, 79B, 79C, and 79D are collectively referred to, the exposure control process programs are referred to as "exposure control process program" without the reference numerals.

In the above-described embodiments, the form has been described in which the CPU 74 controls the light transmittance of the ND filter 80 as the second process; however, the form for controlling the amount of exposure in the second process is not limited to this. For example, a form may be employed in which the CPU 74 controls the image signal processing circuit 52 to control the gains of image signals output from the imaging device 22, thereby performing the exposure control process to control exposure.

Figure 22:
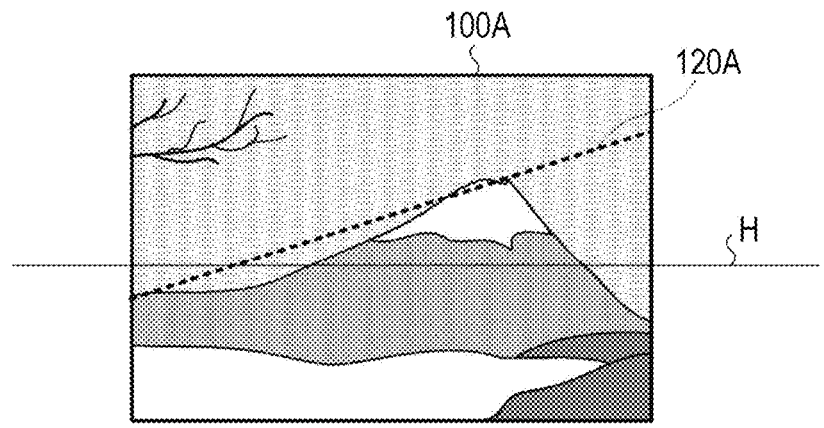
FIG. 22 is a diagram for explaining a boundary line inclined relative to the horizontal direction.
Figure 23:
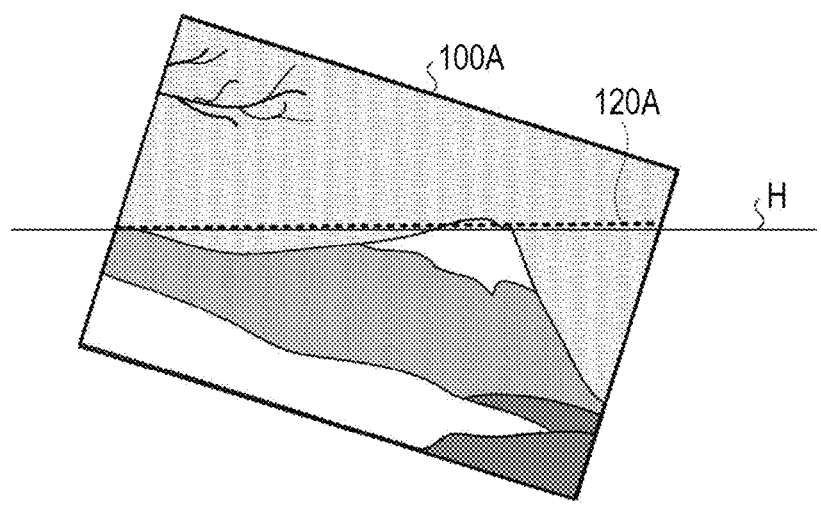
FIG. 23 is a diagram for explaining a state where the boundary line is made to coincide with the horizontal direction.

In the image capturing apparatus of the above-described embodiments, a derived boundary line 120A may be inclined relative to (angled away from) the horizontal direction H, as in a live preview image 100A, an example of which is illustrated in FIG. 22. In this case, it is difficult to perform the first process for controlling the HD length for each row of the pixels 90. Therefore, preferably, the image capturing apparatus presents, to the user, information for encouraging the user to tilt the image capturing apparatus main body so that the live preview image 100A is in an example state illustrated in FIG. 23 and the boundary line 120A coincides with the horizontal direction H. In a case where the image capturing apparatus main body is tilted, the captured image is inclined accordingly. Therefore, it is preferable to perform trimming in accordance with the horizontal direction H.

Figure 24:
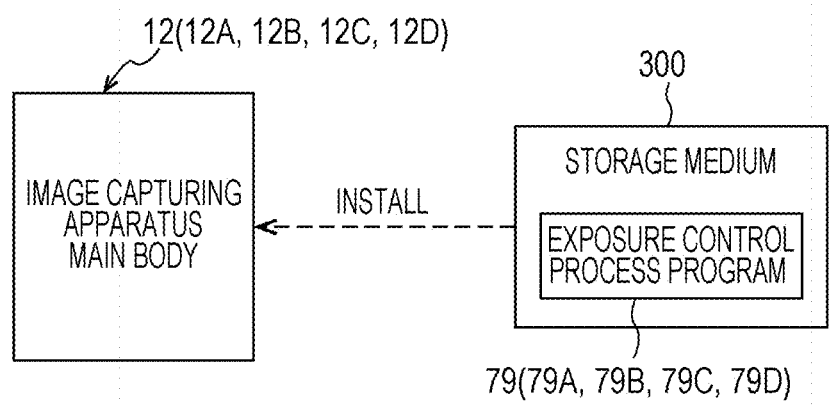
FIG. 24 is a schematic diagram illustrating an example form in which an exposure control process program according to the embodiments is installed on an image capturing apparatus main body from a storage medium in which the exposure control process program is stored.

In the above-described embodiments, the example case where the exposure control process program is read from the secondary storage unit has been described; however, the exposure control process program need not be stored in the secondary storage unit at the beginning. For example, as illustrated in FIG. 24, the exposure control process program may be first stored in advance in any portable storage medium 300, such as an SSD (solid state drive), a USB (universal serial bus) memory, or a CD-ROM (compact disc read-only memory). In this case, the exposure control process program stored in the storage medium 300 is installed on the image capturing apparatus main body, and the installed exposure control process program is executed by the CPU 74.

Alternatively, the exposure control process program may be stored in advance in a storage unit of another computer, server apparatus, or the like connected to the image capturing apparatus main body via a communication network (not illustrated), and the exposure control process program may be downloaded in response to a request from the image capturing apparatus main body. In this case, the downloaded exposure control process program is executed by the CPU 74.

The exposure control process described in the above-described embodiments is only an example. Therefore, an unnecessary step may be deleted, a new step may be added, or the order of processes may be changed without departing from the spirit, as a matter of course.

In the above-described embodiments, the example case where the exposure control process is implemented by using a software configuration using a computer has been described; however, the technique of the present disclosure is not limited to this. For example, instead of the software configuration using a computer, the exposure control process may be performed by using only a hardware configuration, such as an FPGA (field-programmable gate array) or an ASIC (application specific integrated circuit). Alternatively, the exposure control process may be performed by using a configuration obtained by combining the software configuration and the hardware configuration.

All documents, patent applications, and technical standards described in this specification are incorporated herein by reference to the same extent as in a case where the documents, patent applications, and technical standards are specifically and individually described as being incorporated herein by reference.

REFERENCE SIGNS LIST 10, 10A, 10B, 10C, 10D image capturing apparatus
12, 12A, 12B, 12C, 12D image capturing apparatus main body
13, 15 mount
14 image capturing lens
16 focus ring
18 lens unit
19 aperture diaphragm
20 focus lens
22 imaging device
22A photosensitive surface
24 dial
26 release button
28 display
29 touch panel display
30 cross key
32 MENU/OK key
34 BACK/DISP button
36 viewfinder
38 touch panel
40 control device
42 first mirror
44 second mirror
46, 46A, 46B, 46C, 46D control unit
48 mirror driving unit
50 imaging device driver
52 image signal processing circuit
54 image memory
56 image processing unit
58 display control unit
60 accepting I/F
62 accepting device
64 medium I/F
66 memory card
72 external I/F
74 CPU
76 primary storage unit
78, 78A, 78B, 78C, 78D secondary storage unit
79, 79A, 79B, 79C, 79D exposure control process program
80 ND filter
81 bus line
82 ND filter driving unit
90 pixel
100, 100A live preview image
110, 126, $126_p$, $126_{c1}$, $126_{c2}$, $126_{f1}$, $126_{f2}$ moving subject
114, 116 information
120, 120A boundary line
122, 124 division region
$126_{c3}$, $126_{p3}$, $126_{f31}$, $126_{f32}$ formed image
200 histogram
202, 204 peak
206 range
208 brightness value
300 storage medium
α photosensitive surface cover position
β photosensitive surface open position
H horizontal direction
L1 optical axis

What is claimed is:

1. An image capturing apparatus comprising:
an image sensor, in which a plurality of pixels are arranged in a two-dimensional array, that outputs an image signal obtained by image capturing of a photographic subject by the image sensor through an image capturing optical system;
a processor; and
a display,
wherein the processor configured to
generate a captured image based on the image signal,
determine whether an image of a moving subject is included in the captured image,
control an amount of exposure of the image sensor by performing a first process for controlling an exposure time of the image sensor for each row of the array of the plurality of pixels in a case where an image of a moving subject is included in the captured image, and control the amount of exposure of the image sensor by performing a second process different from the first process in a case where no moving-subject image is included in the captured image, and
wherein the display displays the captured image obtained with the amount of exposure controlled by the processor.

2. The image capturing apparatus according to claim 1, wherein
the processor further configured to control an amount of light that reaches the image sensor per unit time as the second process.

3. The image capturing apparatus according to claim 1, wherein
the processor further configured to perform the first process in a case where a brightness of a moving-subject region that includes the image of the moving subject is equal to or higher than a predetermined brightness.

4. The image capturing apparatus according to claim 2, wherein
the processor further configured to perform the first process in a case where a brightness of a moving-subject region that includes the image of the moving subject is equal to or higher than a predetermined brightness.

5. The image capturing apparatus according to claim 1, wherein
the processor further configured to perform the second process in a case where a brightness of a moving-subject region that includes the image of the moving subject is lower than a predetermined brightness.

6. The image capturing apparatus according to claim 3, wherein
the processor further configured to
divide the captured image into a plurality of division regions on the basis of a result of analysis of the captured image, and
assume a region in which the image of the moving subject is included among the plurality of division region to be the moving-subject region.

7. The image capturing apparatus according to claim 1, wherein
the processor further configured to divide the captured image into a plurality of division regions along a boundary line determined on the basis of a result of analysis of the captured image.

8. The image capturing apparatus according to claim 1, wherein
the processor further configured to perform the first process in a case where a moving speed of the moving subject detected from the image of the moving subject is equal to or higher than a predetermined speed.

9. The image capturing apparatus according to claim 1, wherein
the processor further configured to perform the second process in a case where a moving speed of the moving subject detected from the image of the moving subject is lower than a predetermined speed.

10. The image capturing apparatus according to claim 1, wherein the processor further configured to perform the first process in a case where an amount of movement, per unit time, of the moving subject detected from the image of the moving subject is equal to or larger than a predetermined amount of movement.

11. The image capturing apparatus according to claim 1, wherein
the processor further configured to perform the second process in a case where an amount of movement, per unit time, of the moving subject detected from the image of the moving subject is smaller than a predetermined amount of movement.

12. The image capturing apparatus according to claim 1, wherein
before performing the first process, the processor further configured to communicate information indicating that the processor is going to perform the first process.

13. The image capturing apparatus according to claim 1, wherein
the processor further configured to communicate predetermined information in a case where an image of a moving subject is included in the captured image.

14. The image capturing apparatus according to claim 1, wherein
after performing the first process, the processor further configured to communicate information indicating that the processor has performed the first process.

15. The image capturing apparatus according to claim 1, further comprising
an interface that accepts an instruction for performing the first process, wherein
the processor further configured to perform the first process in a case where an image of a moving subject is included in the captured image and the interface accepts an instruction for performing the first process.

16. The image capturing apparatus according to claim 15, wherein
the processor further configured to perform the second process in a case where an image of a moving subject is included in the captured image but the interface does not accept an instruction for performing the first process.

17. The image capturing apparatus according to claim 1, wherein
in a case of performing the first process, the processor further configured to divide the captured image into a plurality of division regions along a boundary line determined on the basis of a result of analysis of the captured image, and perform the first process for each of the plurality of division regions obtained as a result of division.

18. The image capturing apparatus according to claim 1, wherein
in a case where an image of a moving subject is included in the captured image, the processor further configured to divide the captured image into a plurality of division regions on the basis of a result of analysis of the captured image, perform the first process for a division region that includes the image of the moving subject among the plurality of division regions obtained as a result of division, and perform the second process or not to control the amount of exposure of the image sensor for a division region other than the division region that includes the image of the moving subject.

19. A control method for an image capturing apparatus according to claim 1, the control method including a process comprising:
generating the captured image based on the image signal obtained by image capturing of the photographic subject by the image sensor in which the plurality of pixels are arranged in the two-dimensional array;
determining whether the image of the moving subject is included in the captured image;
controlling the amount of exposure of the image sensor by performing the first process for controlling the exposure time of the image sensor for each row of the array of the plurality of pixels in the case where the image of the moving subject is determined to be included in the captured image;
controlling the amount of exposure of the image sensor by performing the second process different from the first process in the case where no moving-subject image is determined to be included in the captured image; and
displaying the captured image obtained with the controlled amount of exposure.

20. A non-transitory computer readable recording medium storing a control program for an image capturing apparatus according to claim 1, for causing a computer to perform a process comprising:
generating the captured image based on the image signal obtained by image capturing of the photographic subject by the image sensor in which the plurality of pixels are arranged in the two-dimensional array;
determining whether the image of the moving subject is included in the captured image;
controlling the amount of exposure of the image sensor by performing the first process for controlling the exposure time of the image sensor for each row of the array of the plurality of pixels in the case where the image of the moving subject is determined to be included in the captured image;

controlling the amount of exposure of the image sensor by performing the second process different from the first process in the case where no moving-subject image is determined to be included in the captured image; and displaying the captured image obtained with the controlled amount of exposure.

\* \* \* \* \*